United States Patent
Colenbrander

(10) Patent No.: US 9,396,702 B2
(45) Date of Patent: Jul. 19, 2016

(54) LATENCY TESTER

(71) Applicant: Sony Computer Entertainment America LLC, San Mateo, CA (US)

(72) Inventor: Roelof Roderick Colenbrander, San Mateo, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 7 days.

(21) Appl. No.: 14/582,027

(22) Filed: Dec. 23, 2014

(65) Prior Publication Data

US 2016/0180811 A1 Jun. 23, 2016

(51) Int. Cl.
| | |
|---|---|
| G09G 5/12 | (2006.01) |
| G01J 3/46 | (2006.01) |
| G06K 9/62 | (2006.01) |
| G06T 7/40 | (2006.01) |
| G06K 9/46 | (2006.01) |
| G09G 5/10 | (2006.01) |
| G09G 5/02 | (2006.01) |
| A63F 13/355 | (2014.01) |

(52) U.S. Cl.
CPC ................ *G09G 5/12* (2013.01); *A63F 13/355* (2014.09); *G01J 3/46* (2013.01); *G06K 9/4652* (2013.01); *G06K 9/4661* (2013.01); *G06K 9/6201* (2013.01); *G06T 7/408* (2013.01); *G09G 5/02* (2013.01); *G09G 5/10* (2013.01); *G09G 2310/08* (2013.01); *G09G 2360/145* (2013.01)

(58) Field of Classification Search
CPC ............ G06F 3/14; G09G 5/006; G09G 5/02; H04N 9/3194; H04N 9/3117
See application file for complete search history.

(56) References Cited

U.S. PATENT DOCUMENTS

| | | | | |
|---|---|---|---|---|
| 6,862,029 | B1 * | 3/2005 | D'Souza ................ | H04N 17/04 345/11 |
| 7,218,258 | B2 * | 5/2007 | Delanghe .............. | H03M 1/183 341/118 |
| 2003/0058202 | A1 * | 3/2003 | Evanicky ............... | G09G 3/006 345/82 |
| 2006/0221093 | A1 * | 10/2006 | Holub ....................... | G06F 3/14 345/589 |
| 2011/0126255 | A1 | 5/2011 | Perlman et al. | |
| 2014/0101341 | A1 | 4/2014 | Colenbrander | |
| 2014/0121009 | A1 * | 5/2014 | Watson ................... | A63F 13/52 463/31 |
| 2014/0179436 | A1 | 6/2014 | Karamfilov et al. | |

OTHER PUBLICATIONS

Notification of Transmittal of the International Search Report and the Written Opinion of the International Searching Authority issued in International Application No. PCT/US2015/060621, mailed Feb. 19, 2016 (11 total pages).

* cited by examiner

*Primary Examiner* — Kevin M Nguyen
(74) *Attorney, Agent, or Firm* — Martine Penilla Group, LLP

(57) ABSTRACT

A method is provided, comprising: sensing color intensity values of light emitted from a portion of a display screen for a predefined period of time, the display screen being configured to display a video stream that defines the light emitted from the portion of the display screen, the video stream being generated by an executing video game; during the period of time, triggering a controller device to communicate an input event to the video game, the video game being configured to process the input event and responsively update the video stream to change a color of the light, from a first color to a second color; analyzing the sensed color intensity values to identify a latency amount that is defined by a duration of time extending from the triggering of the controller device to the change in the color of the light emitted from the portion of the display screen.

30 Claims, 15 Drawing Sheets

LATENCY TESTER

FIELD OF THE INVENTION

The present invention relates to a latency tester and associated methods and systems.

BACKGROUND

Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), Sony Playstation3® (PS3), and Sony Playstation4® (PS4), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

Another growing trend in the industry involves the development of cloud-based gaming systems. Such systems may include a remote processing server that executes a game application, and communicates with a local thin client that can be configured to receive input from users and render video on a display.

All game sessions are subject to latency or lag, which can be measured as the delay time occurring between an input event, such as a button press by a user at a controller device, and a resultant output event rendered to the user, such as a change to video rendered on a display. For a local game session, the built-in latency can include input latency, game latency and output latency. In the case of cloud gaming, in which a game runs on a server in a data center and where the audio/video is streamed to a user over a network (e.g. the internet), there can be additional latency, including the following: internet delay, video capture, video encoding, video decoding, etc.

It can be useful to measure the latency of a gaming system, as this helps to quantify the user gaming experience, and allows for further optimization of gaming technology to reduce latency. One commonly-used method for measuring latency utilizes a setup consisting of a high-speed camera in combination with an input device, a computer system and a display. The principle applied is that a key press on an input device triggers a change on a display, which is measured by the camera. The latency corresponds to the number of video frames between the key press and the display changing.

However, this method for measuring latency works has two major flaws. First, it is prone to measurement inaccuracy. It takes a small amount of time for a human to press a button on an input device, and at some point during the movement of a human finger, a key press is triggered. However, it is difficult to ascertain when exactly the key press occurs. It also takes a small amount of time for a display to switch colors. A high-speed camera can record the whole transition, but again, it is difficult to ascertain precisely when the color change has occurred. Further, the analysis of the video frames for latency is done by a human, and as such, different users may identify different transition times for each of these events. This can lead to differences in latency measurements of tens of milliseconds between users.

Second, the method is labor intensive. A video must first be taken by a camera, then the frames transferred to a computer, and finally they are manually analyzed to compute the latency. This process typically takes a few minutes.

It is in this context that embodiments of the invention arise.

SUMMARY

Embodiments of the present invention provide for a latency tester and associated methods and systems.

In one embodiment, a method is provided, comprising: sensing color intensity values of light emitted from a portion of a display screen for a predefined period of time, the display screen being configured to display a video stream that defines the light emitted from the portion of the display screen, the video stream being generated by an executing video game; during the period of time, triggering a controller device to communicate an input event to the video game, the video game being configured to process the input event and responsively update the video stream to change a color of the light emitted from the portion of the display screen, from a first color to a second color; analyzing the sensed color intensity values to identify a latency amount that is defined by a duration of time extending from the triggering of the controller device to the change in the color of the light emitted from the portion of the display screen.

In one embodiment, sensing color intensity values is performed by a color sensor at a predefined sample rate.

In one embodiment, analyzing the sensed color intensity values includes determining an amount of the sensed color intensity values recorded between the triggering of the controller device and the change in the color of the light, and determining the latency amount based on the determined amount of the sensed color intensity values and the predefined sample rate.

In one embodiment, the video game is executed on one or more of a local computing device and/or a remote gaming server.

In one embodiment, the input event is defined to effect an in-game action when processed by the executing video game.

In one embodiment, the method further includes: displaying the latency amount on a second display screen.

In one embodiment, the method further includes: sending the latency amount to the executing video game.

In one embodiment, the sensed color intensity values include color intensity values for a first sensed color by the color sensor, and color intensity values for a second sensed color by the color sensor.

In one embodiment, analyzing the sensed color intensity values includes comparing the color intensity values for the first sensed color with reference intensity values for the first sensed color, and comparing the color intensity values for the second sensed color with reference intensity values for the second sensed color.

In one embodiment, the first sensed color and the second sensed color are selected from the group consisting of red, green, or blue.

In another embodiment, a latency tester device is provided, comprising: a color sensor for sensing color intensity values of light emitted from a portion of a display screen for a predefined period of time, the display screen being configured to display a video stream that defines the light emitted from the portion of the display screen, the video stream being generated by an executing video game; a signal generator configured to generate a signal, during the period of time, triggering a controller device to communicate an input event to the video game, the video game being configured to process the input event and responsively update the video stream to change a color of the light emitted from the portion of the display screen, from a first color to a second color; a latency analyzer configured to analyze the sensed color intensity values to identify a latency amount that is defined by a duration of time extending from the triggering of the controller device to the change in the color of the light emitted from the portion of the display screen.

In one embodiment, the color sensor is configured to sense color intensity values at a predefined sample rate.

In one embodiment, the latency analyzer is configured to determine an amount of the sensed color intensity values recorded between the triggering of the controller device and the change in the color of the light, and determine the latency amount based on the determined amount of the sensed color intensity values and the predefined sample rate.

In one embodiment, the video game is executed on one or more of a local computing device and/or a remote gaming server.

In one embodiment, the input event is defined to effect an in-game action when processed by the executing video game.

In one embodiment, the latency tester device further comprises a local display screen configured to display the latency amount.

In one embodiment, the latency tester device further comprises, sending the latency amount to the executing video game.

In one embodiment, the sensed color intensity values include color intensity values for a first sensed color by the color sensor, and color intensity values for a second sensed color by the color sensor.

In one embodiment, the latency analyzer is configured to compare the color intensity values for the first sensed color with reference intensity values for the first sensed color, and compare the color intensity values for the second sensed color with reference intensity values for the second sensed color.

In one embodiment, the first sensed color and the second sensed color are selected from the group consisting of red, green, or blue.

In another embodiment, a method for detecting latency of a gaming system is provided, comprising: detecting, by a color sensor, a first color rendered on a portion of a display by a gaming system, the first color being rendered as part of a video stream generated by the gaming system; triggering a controller device to generate and send an input event to the gaming system, the gaming system being configured to process the input event and responsively update the video stream to change the first color to a second color; detecting, by the color sensor, the change from the first color to the second color rendered on the portion of the display; determining a latency amount as an amount of time measured from the triggering of the controller device to the detection of the change from the first color to the second color.

In one embodiment, detecting the first color includes sensing, by a color sensor, first intensity values of light emitted from the portion of the display when the first color is rendered on the portion of the display, and determining the first intensity values as being substantially similar to reference intensity values that identify the first color; and, detecting the change from the first color to the second color includes sensing, by the color sensor, second intensity values of light emitted from the portion of the display when the second color is rendered on the portion of the display, and determining the second intensity values as being substantially similar to reference intensity values that identify the second color.

In one embodiment, the reference intensity values that identify the first color include a first reference intensity value for a first reference color detected by the color sensor, and a second reference intensity value for a second reference color detected by the color sensor; and, the reference intensity values that identify the second color include a third reference intensity value for the first reference color, and a fourth reference intensity value for the second reference color.

In one embodiment, the first reference color and the second reference color are selected from the group consisting of red, green, and blue.

In one embodiment, determining the first intensity values as being substantially similar to the reference intensity values that identify the first color includes, normalizing the first intensity values against the reference intensity values that identify the first color; and, determining the second intensity values as being substantially similar to the reference intensity values that identify the second color includes, normalizing the second intensity values against the reference intensity values that identify the second color.

In one embodiment, the method further includes: performing a calibration operation to determine the reference intensity values that identify the first color and the reference intensity values that identify the second color.

In one embodiment, the method further includes: issuing a command to the gaming system to cause the first color to be rendered on the portion of the display.

In one embodiment, the method further includes: substantially simultaneous with triggering the controller device, initiating a timer; substantially simultaneous with detecting the change from the first color to the second color, stopping the timer; wherein the latency amount is defined by the duration from the initiation of the timer to the stopping of the timer.

In one embodiment, the gaming system is a console device.

In one embodiment, the gaming system is a cloud gaming server.

It should be appreciated that the present invention can be implemented in numerous ways, such as a process, an apparatus, a system, a device or a method on a computer readable medium. Several inventive embodiments of the present invention are described below.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments provide a latency tester and associated systems, methods, and apparatuses.

It will be obvious, however, to one skilled in the art, that the present invention may be practiced without some or all of these specific details. In other instances, well known process operations have not been described in detail in order not to unnecessarily obscure the present invention.

Figure 1:
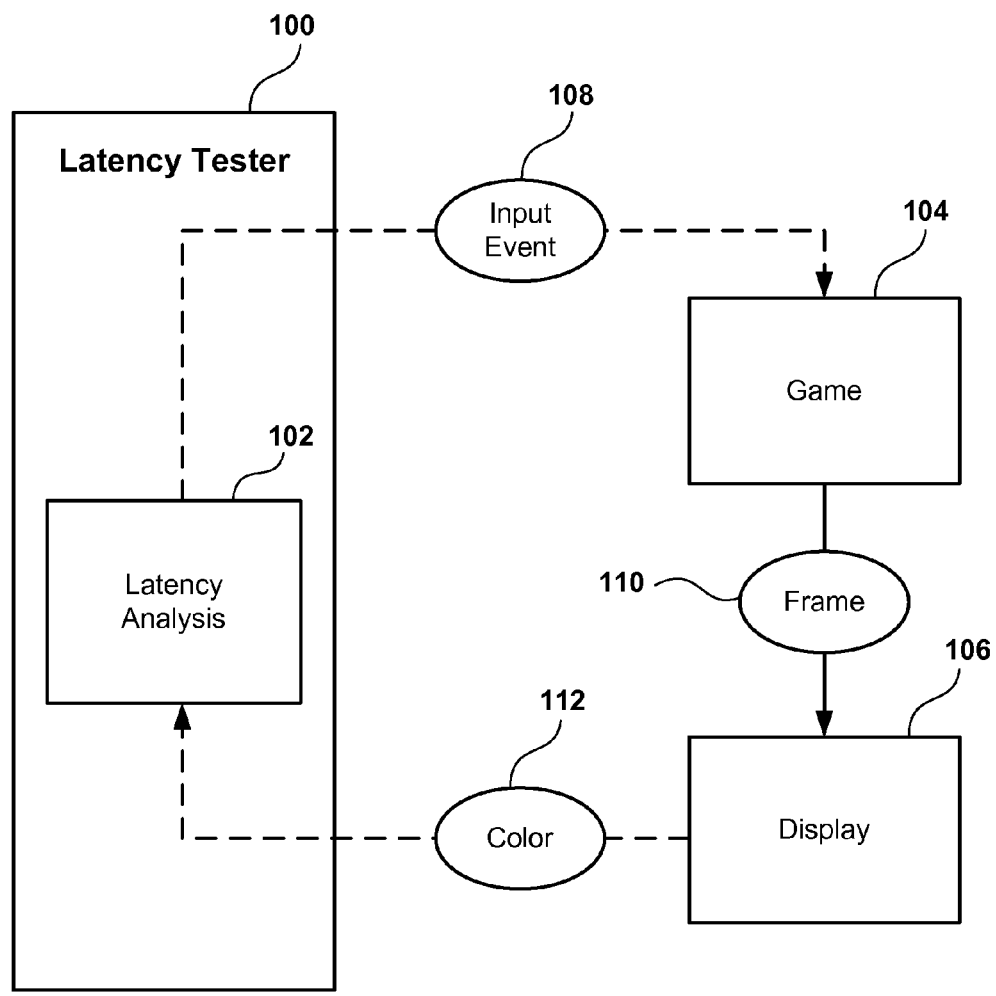
FIG. 1 illustrates a system for testing latency of a video game executed on a console device, in accordance with an embodiment of the invention.

FIG. 1 conceptually illustrates a system for testing latency of a video game, in accordance with an embodiment of the invention. Broadly speaking, the system includes a latency tester device 100, a video game 104, and a display device 106. The video game 104 can in various embodiments be executed locally on a computing device, executed remotely in a cloud-gaming implementation, or a combination thereof (executed partially locally and partially remotely). Examples of computing devices for local execution include a gaming console, personal computer, laptop, tablet, mobile device, cellular phone, portable gaming device, smart television, set-top box, or any other general or special purpose computer which can be configured for local execution of a video game. In cloud-gaming implementations, the video game 104 can be executed on a remote server or other remote computing hardware. In some implementations, the video game can be instantiated within a virtual machine configured to mimic the execution environment of a gaming device such as a gaming console.

During execution of the video game 104, the video game generates video frames 110 which are rendered on the display device 106 to be viewed by a user. In order to test the latency of the gaming system, the latency tester is configured to generate an input event 108. The input event 108 is sent to the video game 104 and processed by the video game to trigger a color change or some other identifiable visual event that will be encoded in the video frames 110, and rendered to the display 106. In some implementations, the input event 108 triggers a change in color 112 of at least a portion of the display screen, and this change in color is detected by the latency tester 100. The latency tester 100 physically detects the light being emitted by the display 106 to identify the change in color. In the illustrated embodiment, the latency tester includes latency analysis logic 102 that is configured to determine the latency as the amount of time elapsed from when the input event was generated to when the change in color of the display 106 was detected.

In some implementations, the latency tester 100 is configured to detect in real-time the change in color emitted by the display 106. This can be accomplished through sensing and tracking in real-time the color emitted by the display to identify when the change in color occurs. However, in other implementations, the latency tester 100 is configured to first record data quantifying color intensity levels of the light output by the display, and then perform an after-the-fact analysis of the data to determine when the color change occurred. It will be appreciated that the latency tester 100 is configured to recognize both the color emitted by the display before the input event, and the different color emitted by the display after processing the input event.

Figure 2:
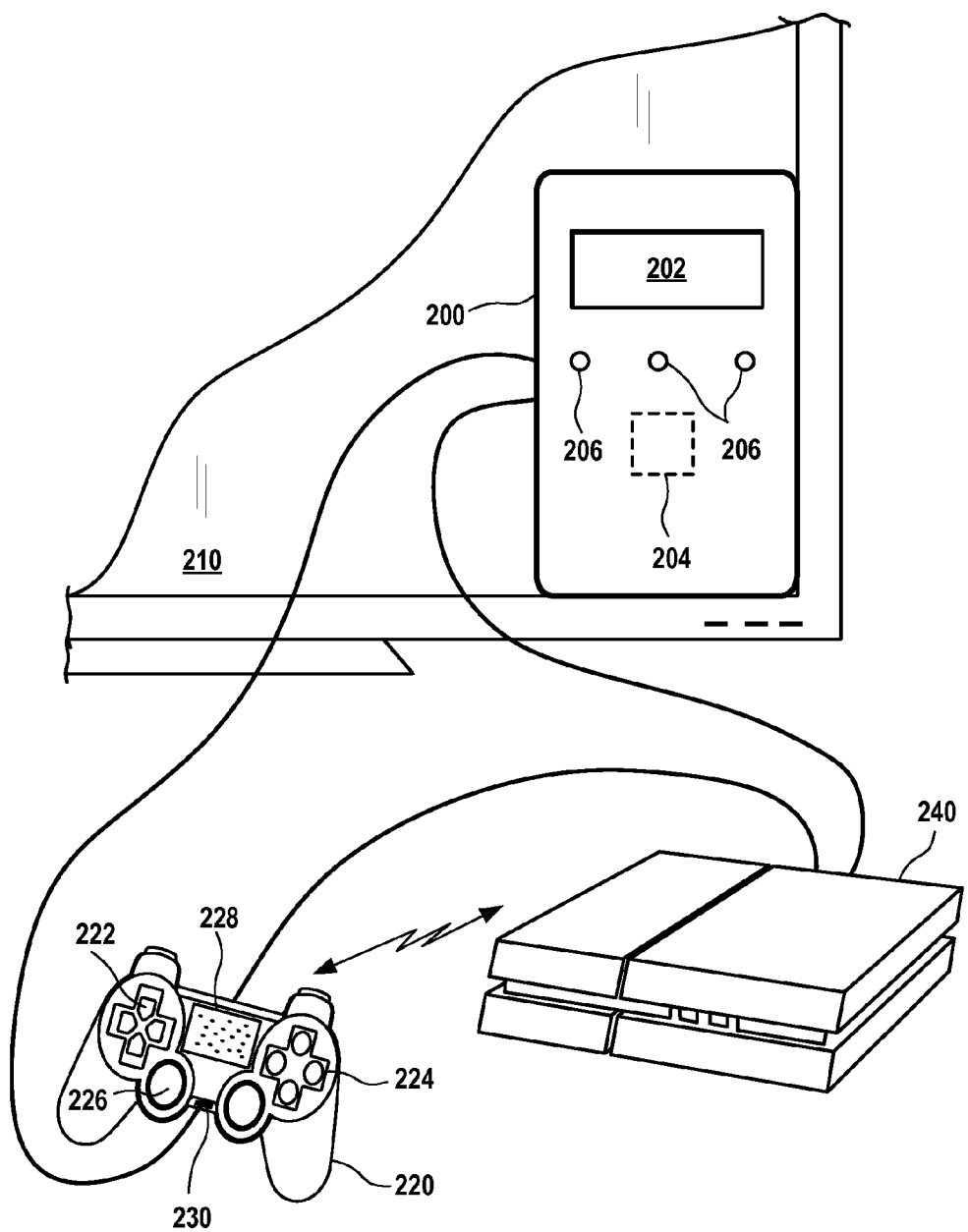
FIG. 2 illustrates a system for testing latency of a video game, in accordance with an embodiment of the invention.

FIG. 2 illustrates a system for testing latency of a video game, in accordance with an embodiment of the invention. A latency tester device 200 is shown, mounted to a display 210. The latency tester device 200 can be mounted to the display by any method and hardware, provided that the latency tester device 200 will maintain a fixed position against the display surface. In some implementations, the latency tester device 200 includes suction cups on its underside (i.e. display-facing side) that adhere to the display surface. In some implementations, a clip/vise/clamp mechanism is provided that extends around an edge of the display to the display's back side when in use, and thereby clamps the latency tester device to the front side of the display. In some implementations, a cord extending from the latency tester device 200 has a counterweight affixed thereto for purposes of positioning the latency tester device 200 on the display 210. In operation, the cord is draped over the top of the display 210, so that the latency tester device 200 is positioned against the front side of the display, while the counterweight is positioned against (or adjacent to) the back side of the display. The weight/force of the counterweight offsets that of the latency tester device, and thus prevents the latency tester device from moving.

Additionally, the latency tester device 200 may include one or more pads on its underside, the pads consisting of a non-abrasive material (e.g. felt, microfiber, etc.) that will not scratch or otherwise damage the display surface. In this manner, the latency tester device 200 can rest against the surface of the display without causing damage to the display surface.

The latency tester device 200 includes a local display 202 which can be configured to display data such as latency test results. A color sensor 204 is configured to detect color intensity data of light emitted from the display 210. The color sensor 204 is positioned on the underside of the latency tester device 204, and in some implementations is configured to detect intensity values for red, green and/or blue. In various implementations, the color sensor can be configured to detect intensity values for any color suitable for the purpose of determining latency in accordance with the principles of the present disclosure. The latency tester device 200 further includes one or more buttons 206, which can be configured for various purposes relating to the functionality of the latency tester device 200. By way of example, a button may be configured to initiate a calibration procedure, initiate a latency test, display results, etc.

With continued reference to FIG. 2, a controller device 220 is configured to provide input to a video game that executes on a gaming console 240. One example of gaming console is the Sony PlayStation® 4 gaming console. It should be appreciated that in other implementations, any type of computing device that is capable of executing a video game and supporting the functionality to facilitate latency testing as discussed herein may be substituted for the gaming console referenced in the present embodiment, including without limitation, a personal computer, laptop, tablet, cellular phone, PDA, portable gaming device, etc. One example of a controller device is the Sony DUALSHOCK® 4 wireless controller. In other implementations, any other type of controller device may be utilized, including various types of motion controllers, wired/wireless controllers, steering wheel controllers, and or any other peripheral input devices which may provide input to a video game.

In the illustrated embodiment, the controller 220 includes a data port 230 that facilitates connection to the latency tester device 200. The controller device 220 as shown includes various input devices, such as directional pad 222, touch-sensitive pad 228, buttons 224, and joysticks 226. Additionally, the controller device 220 may include various motion sensing hardware, such as accelerometers, gyroscopes, and magnetometers. It should be appreciated that the aforementioned types of input mechanisms are provided by way of example only, and that the input devices included in the controller device 220 may include any type of input device useful for providing input to a video game. Additionally, the controller device 220 may include any of various kinds of feedback mechanisms, including, without limitation, speakers for providing audio feedback, lights, vibration/tactile feedback mechanisms, etc. The controller device 220 can communicate with the gaming console 240 via a wired and/or wireless connection.

Broadly speaking, to effect a latency test, the latency tester device 200 can be configured to cause the video game to render a first color in the region of the display that is being monitored by the latency tester device. That is, the video frames generated by the video game are configured to encode for the first color to be rendered by the display 210 in the region monitored by the latency tester device. Then the latency tester device 200 triggers the controller device 220 to generate an input event that is sent from the controller device 220 to the video game (e.g. in the illustrated embodiment, the input event is sent to the console device 240, on which the video game is executing). In response to receiving the input event, the video game then changes the first color to a second color. That is, the video game, upon processing the input event, generates video frames which encode for the second color in place of the first color when rendered by the display 210. The change from the first color to the second color is detected by the latency tester device, as determined from data generated by its color sensor 204.

To determine the amount of latency of the video game system, the latency tester is configured to measure the elapsed amount of time from when the controller device 220 was triggered (to generate the input event) to when the change from the first color to the second color is detected. In some real-time implementations, the measurement of elapsed time is effected through a timer that is initiated at the time the input event is triggered. The timer is stopped when the change from the first color to the second color is detected in real-time and the elapsed time of the timer is determined to be the latency amount. In similar implementations, timestamps corresponding to the input event and the detected change from the first color to the second color are identified and the elapsed time between the timestamps is determined as the latency amount. In some non-real time implementations, color sensor data is first recorded and then analyzed after the fact to identify the elapsed time from the input event to the detected change in color. In some implementations, the color sensor is configured to record color sensor readings at a predefined frequency, and the elapsed time is determined based on the number of color sensor readings occurring between the time of the input event and the detected change in color.

Once the latency amount is determined, it may be output in various ways. In some implementations, the latency amount is rendered on the local display 202 of the latency tester device 200. In some implementations, the latency amount is communicated to the console 240. It will be appreciated that the foregoing implementations have been described with reference to a gaming console 240, however, similar concepts may be applied to cloud-gaming implementations, with a cloud-gaming server being included in place of (or in addition to) the gaming console.

Figure 3:
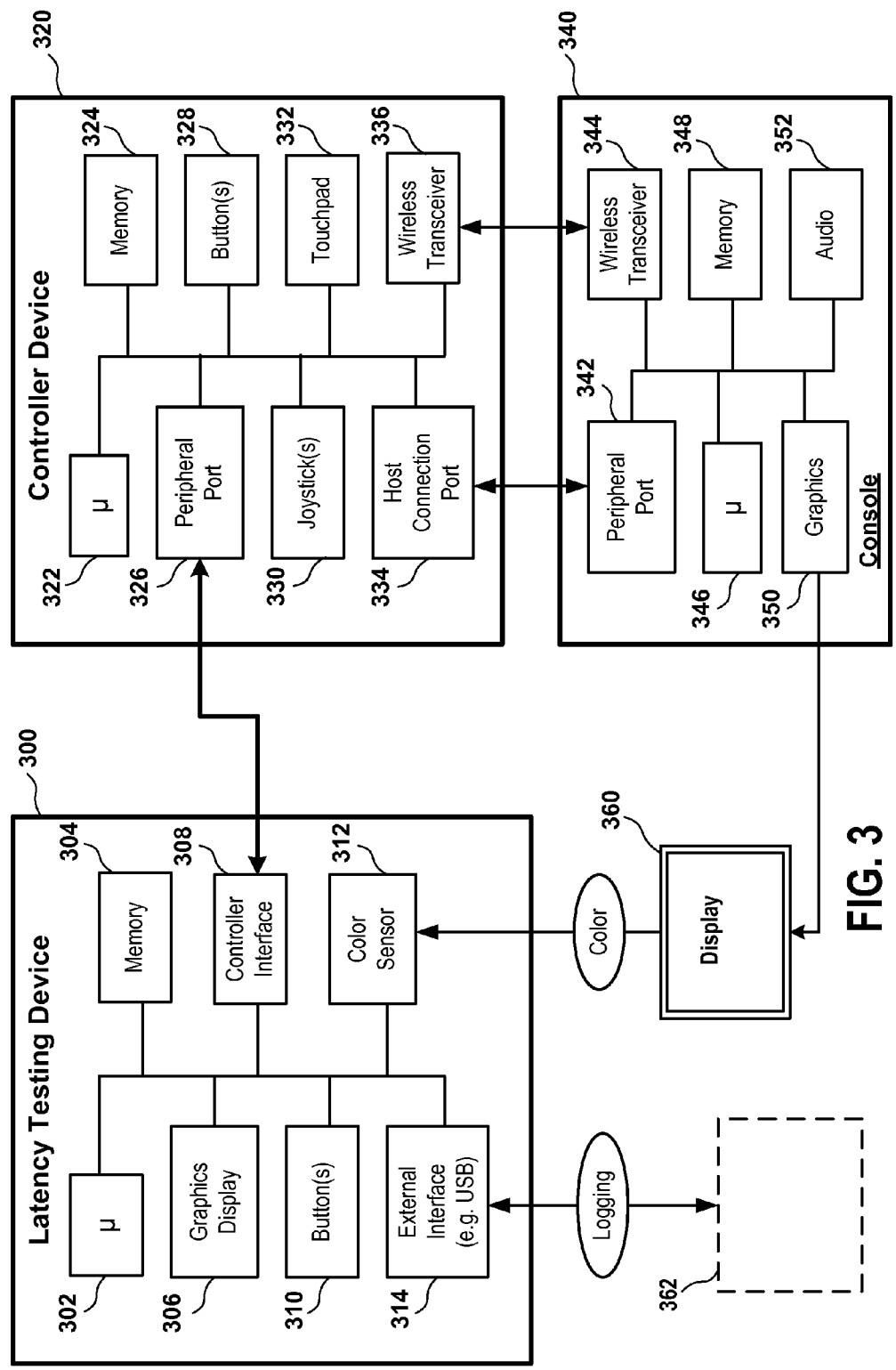
FIG. 3 illustrates a system for testing latency of a video game, in accordance with an embodiment of the invention.

FIG. 3 illustrates a system for testing latency of a video game, in accordance with an embodiment of the invention. A latency testing device 300 includes a processor 302 for executing program instructions and processing data, and memory 304 for storing data and program instructions. A graphics display 306 is provided and can be configured to provide an interface for controlling the latency testing device, as well as display data related to latency testing such as latency test results. A controller interface 308 is provided for connection to a controller device, and to facilitate communication therewith. The latency testing device 300 may further include input devices such as buttons 310. It will be appreciated that other types of input devices can be included, such as a keyboard, numerical pad, touchscreen/touchpad, etc.

A color sensor 312 is configured to sense/detect colors of light emitted by a display 360. The color sensor 312 can be configured to output quantified intensity values for specifically sensed colors. In some implementations, the color sensor is configured to detect red, green and/or blue color values. It will be appreciated that in various implementations, the color sensor can detect intensity values for any specific color.

In some implementations, the color sensor is configured to detect intensity values for at least two different colors.

The latency tester device 300 additionally includes an external interface 314, which provides for connection to an external device 362. In some implementations, the external interface 314 is defined by a Universal Serial Bus (USB) interface. The external device can be any of a variety of computing devices, such as a personal computer, laptop, tablet, etc. In some implementations, the latency testing device 300 is configured to send generated data to the external device 362 for logging purposes. By way of example, such data may include color sensor data, data indicative of communication with the controller device 320, or any other type of data generated by the latency testing device 300.

Controller device 320 includes a processor 322 for executing program instructions and processing data, and a memory 324 for storing data and program instructions. A peripheral communications port 326 is provided for connection to, and to facilitate communication with, other devices. In the illustrated embodiment, the peripheral communications port 326 is utilized for connection to the latency testing device 300. The controller device 320 can receive an instruction from the latency testing device via the peripheral communications port 326, to trigger an input event to be generated by the controller device. The input event can be defined by the generation of an input signal that is indicative of actuation of any input device that is defined at the controller device 320. By way of example, the controller device 320 may include input devices such as button(s) 328, joystick(s) 330, touchpad 332, motion sensors, etc.

The controller device 320 may communicate with a host computing device, such as a console device 340, via a wired or wireless connection. In some implementations, the controller device includes a host connection port 334 to allow for a wired connection to the console device 340. The controller device 320 further includes a wireless transceiver 336 to facilitate wireless communication with the console device 340 and/or other devices.

In the illustrated embodiment, the console device 340 includes a peripheral port 342 to facilitate a wired connection to peripheral devices such as the controller device 320. A wireless transceiver 344 is provided to enable wireless communication with peripheral devices or other devices. The console device 340 includes a processor for executing program instructions and processing data, as well as memory 348 for storing program instructions and data. A graphics processor 350 is configured to output video data for rendering by a display 360. The video data can be defined by a series of encoded video frames, which define the moment-to-moment visual output of the video game. An audio processor 352 is configured to output audio data for rendering by a speaker (not shown).

Figure 4:
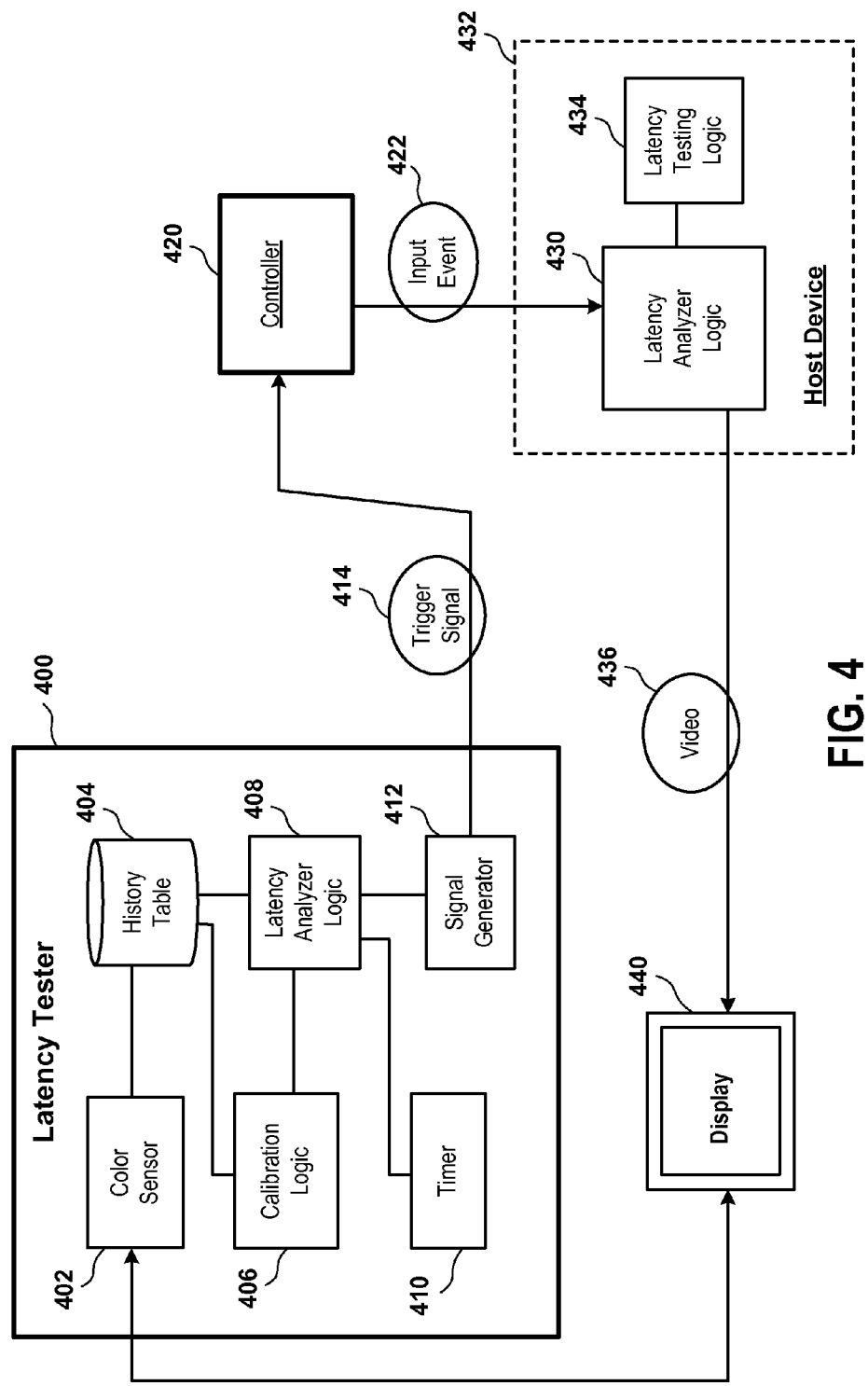
FIG. 4 illustrates a system for determining latency of a video game, in accordance with an embodiment of the invention.

FIG. 4 illustrates a system for determining latency of a video game, in accordance with an embodiment of the invention. In the illustrated embodiment, a conceptual flow of events occurring during a latency test are shown. The latency testing device 400 includes a color sensor 402 that is configured to detect colors of light emitted by a portion of a display 440 (over which the color sensor is positioned). When activated, the color sensor 402 may output intensity values for specifically detected colors (e.g. red, green, blue, or any other color) at a predefined sample rate/frequency. In some implementations, a microcontroller or processor may poll or be notified of data availability from the color sensor, e.g. by an interrupt from the color sensor. In another implementation, the processor or microcontroller polls the color sensor at a predefined rate for intensity values, and thereby controls the effective sample rate/frequency. In some implementations, the intensity values are stored to history table 404, from which they may be retrieved for analysis.

For purposes of clarity, it is important to understand and distinguish between the light emitted by the display 440 and the colors sensed by the latency testing device 400. When the display 440 receives video data 436, it renders the video data by directing each pixel to generate a color in accordance with the video data. That is, the video data 436 defines a color to be rendered by each pixel of the display 440. Upon rendering, each pixel physically outputs light that can be detected/sensed by the color sensor 402. Thus, for a given pixel, there is a color defined by the video data 436 that is rendered by the pixel as an emission of light. The light that is actually physically emitted by the pixel (in response to the video data) can also be said to have a color distinct from that defined by the video data. However, for purposes of simplification in the present disclosure, the color of the light emitted by a pixel will be considered to be the color that is defined by the video data.

The color sensor 402 detects the intensity of specific colors that the color sensor is configured to detect. For example, in implementations wherein the color sensor is an RGB color sensor, then the color sensor is capable of detecting/sensing intensity values for the colors red, green, and/or blue. The output of such a color sensor may include intensity values for any of the detected colors—e.g. a red intensity value, a green intensity value, and/or a blue intensity value.

Calibration logic 406 is configured to perform an initial calibration prior to performance of a latency test, to determine reference intensity values corresponding to specific visual output by the display 440. That is, the reference intensity values are intensity values of the colors sensed by the color sensor when the display is configured to emit light of a known and predefined color that will be utilized to ascertain latency. This will be further understood by considering the overall latency testing schema. As has been noted, in accordance with some implementations, a latency test is conducted by detecting a first color on the display 440, generating an input event, and detecting when the first color is changed to a second color in response to the input event. Thus, the latency testing device 400 can be calibrated to identify the first and second colors rendered by the display 440.

To accomplish this, the first color is rendered by the display 440 (at least in the region of the display from which emitted light will be detected by the color sensor). Then readings are taken by the color sensor 402 while the first color is rendered on the display. The readings taken define reference intensity values for colors sensed by the color sensor when the display is configured to render the first color. Then the first color is changed to a second color. And again, readings are taken from the color sensor 402 while the second color is being rendered by the display. These readings define reference intensity values for the colors sensed by the color sensor when the display is configured to render the second color. Thus, there are reference intensity values (for colors sensed by the color sensor) that correspond to the first color being rendered on the display, and reference intensity values (for colors sensed by the color sensor) that correspond to the second color being rendered on the display. Therefore, when intensity values are detected by the color sensor that match the reference intensity values for either of the first color or the second color, then it can be determined that the first color or the second color, respectively, is being rendered on the display and detected by the latency testing device.

The calibration logic 406 can be configured to perform a calibration procedure such as that described above, to determine reference intensity values for colors sensed by the color sensor 402 that correspond to a first color or a second color being rendered on the display 440. In some implementations, the calibration logic 406 may communicate to the host device 432, to cause the host device to encode the video data 436 to cause rendering of the first color and the second color on the display 440 at the appropriate location. The latency testing device 400 may communicate with the host device 432 directly via a wired/wireless connection, or may communicated with the host device 432 via the controller device 420. By way of example, the calibration logic 406 may be configured to issue a command to the host device 432 to generate video data encoding for the first color to be rendered on the display 440, and then determine reference intensity values (corresponding to the first color) from readings taken by the color sensor 402 while the first color is being rendered. Then the calibration logic 406 may issue a command to the host device 432 to generate video data encoding for the second color to be rendered on the display 440, and then determine reference intensity values (corresponding to the second color) from readings taken by the color sensor 402 while the second color is being rendered. In the above-described implementation, the calibration logic 406 communicates with the host device 432. However, it will be appreciated that in some implementations, the calibration logic may more specifically communicate with latency testing logic 434, which is executed at the host device, to effect the above-described rendering of the first and second colors to the display 440.

The latency testing device 400 includes a latency analyzer logic 408 that is configured to determine the latency of a video game executed on host device 432. The executing video game on the host device 432 defines video game logic 430. The video game logic 430 communicates with latency testing logic 434, which is configured to handle functionality related to performance of latency testing as described herein. To perform a latency test, the latency analyzer logic 408 communicates with latency testing logic 434 (e.g. via controller device 420) to cause the video data 436 to be generated so as to encode for the first color to be displayed on the display 440 in a region or portion of the display that is being monitored by the latency testing device 400 (at which the color sensor 402 is positioned to receive and sense emitted light). The latency analyzer logic 408 determines that the first color is being rendered on the display 440 by determining that color intensity values read by the color sensor 402 match, or substantially match (e.g. differ by less than a predefined tolerance value or percentage), those of reference intensity values corresponding to the first color being rendered on the display.

It will be appreciated that various functional configurations for rendering the first color to the display are possible. In some implementations, latency testing logic 434 is configured to generate an overlay to the video data 436 output by the video game logic 430, the overlay defining the first color for rendering on the display. In other implementations, the latency testing logic 434 may cause the video game logic to generate the video data 436 so as to include the first color. It will further be noted that in some implementations, the latency testing logic 434 may be incorporated into the video game logic 430. It will be appreciated that these and other functional configurations can provide for the incorporation of any color or any other graphics in the outputted video data for purposes of latency testing in accordance with the present disclosure.

After it is confirmed that the first color is being rendered on the display, then the latency analyzer logic 408 activates a signal generator 412 to generate a trigger signal 414 that is communicated to the controller device 420. Upon receipt of the trigger signal 414, the controller device 420 generates an input event 422. The input event 422 can be defined by data that would normally be generated by the controller device 420 when an input device of the controller device 420 is activated, such as when a button is pressed, a joystick is moved, a gesture is made on a touch-sensitive pad, the controller device 420 is moved, etc. However, in the present implementation, no such physical operation of an input device is required. Rather, the controller device 420 generates the input event 422 directly in response to receiving and processing the trigger signal 414.

The input event 422 is sent to the host device 432 (e.g. via a wired/wireless connection), and processed by the video game logic 430. In some implementations, the input event 422 is defined by the video game logic 430 to cause a specific in-game action, such as firing a weapon, moving a character, changing direction, executing a maneuver, jumping, running, or any other in-game action which may be defined for the video game. In other implementations, the input event 422 may not be defined by the video game logic to cause a specific in-game action. In either case, upon processing of the input event 422, the latency testing logic 434 is configured to cause the video data 436 to be updated so as to change the first color to the second color. That is, the video data 436 will be generated/updated so as to encode for the second color to be rendered in place of the first color.

Upon receipt of the updated video data 436, the display 440 will render the second color in place of the first color (at the same location on the display). The latency analyzer 408 is configured to detect when the second color is rendered to the display 440, by determining that intensity values generated by the color sensor 402 match, or substantially match (e.g. differ by less than a predefined tolerance value or percentage), the reference intensity values corresponding to the second color being rendered.

To determine the latency of the video game system, the time elapsing from when the controller is triggered to generate the input event 422, to when the first color changes to the second color, is determined. In some implementations, this is determined in an after-the-fact manner. The color sensor 402 generates intensity values for its sensed colors, which are stored to a history table 404. The intensity values are generated and stored (e.g. at a predefined frequency or sample rate) during the time period when the sequence of events for the latency test occur—when the first color is rendered to the display 440, when the controller 420 is triggered to generate the input event 422, and when the first color is changed to the second color. After a sufficient amount of time for these events to occur has passed, then the history table 404 is then examined to identify when the first color changed to the second color on the display 440, and the latency of the video game system is determined as the time elapsing from when the controller device 420 was triggered to when the color change occurred is determined.

In some implementations, time stamps recorded with event data are utilized. For example, a time stamp for when the trigger signal 414 was sent to the controller device 420 is recorded and defines the start time for the latency test. Time stamps can also be recorded corresponding to the intensity values generated by the color sensor 402. The time stamp of the intensity values that define the change from the first color to the second color can be determined, and the time elapsing from the time stamp of the trigger signal therefrom can be determined.

In some implementations, the color sensor 402 is configured to generate intensity values for sensed colors at a predefined sample rate or frequency. For a given sensed color, the number of intensity values recorded in succession can be utilized to determine an elapsed time. Thus, in some implementations, a recorded intensity value is identified as corresponding to when the trigger signal 414 was sent, and the number of intensity values generated thereafter until the first color changed to the second color is determined. Then, based on the number of intensity values and the predefined sample rate/frequency, the elapsed time is determined.

In some implementations, a real-time, or substantially real-time, determination of latency is performed. The time of the trigger signal 414 is first recorded. Then the latency analyzer logic 408 is configured to analyze in real-time the intensity values generated by the color sensor 402 to identify the transition from the first color to the second color. Upon the identification of the transition, the time elapsing from the time of the trigger signal to the time of the transition is determined. In some implementations, the elapsed time is determined from a timer 410, the timer being started when the trigger signal 414 is sent to the controller 420, and the timer being stopped when the transition from the first color to the second color is detected.

The elapsed time from the sending of the trigger signal 414 to the transition from the first color to the second color on the display 440 defines the latency amount for the video game. This latency amount can be stored, displayed on the latency testing device 400, transmitted to the host device 432 (e.g. to the latency testing logic 434 or the video game logic 430, via the controller device 420), shown on the display 440, etc.

It is noted that some color sensors have the ability to perform comparisons based on threshold values. Therefore, in some embodiments, during calibration, reference values are determined and the threshold for a specific intensity change can be programmed into the color sensor. The color sensor can be configured to generate an interrupt when it encounters a threshold change (e.g. reaches, exceeds, or falls below a threshold). An advantage of this technique lies in the fact that no history table is required to be maintained. However, flexibility may be reduced in the sense that no intermediate values are kept on which some form of signal analysis can be performed (e.g. to filter out effects of backlight modulation/blinking or 50 Hz/60 Hz of lights in the office).

Figure 5:
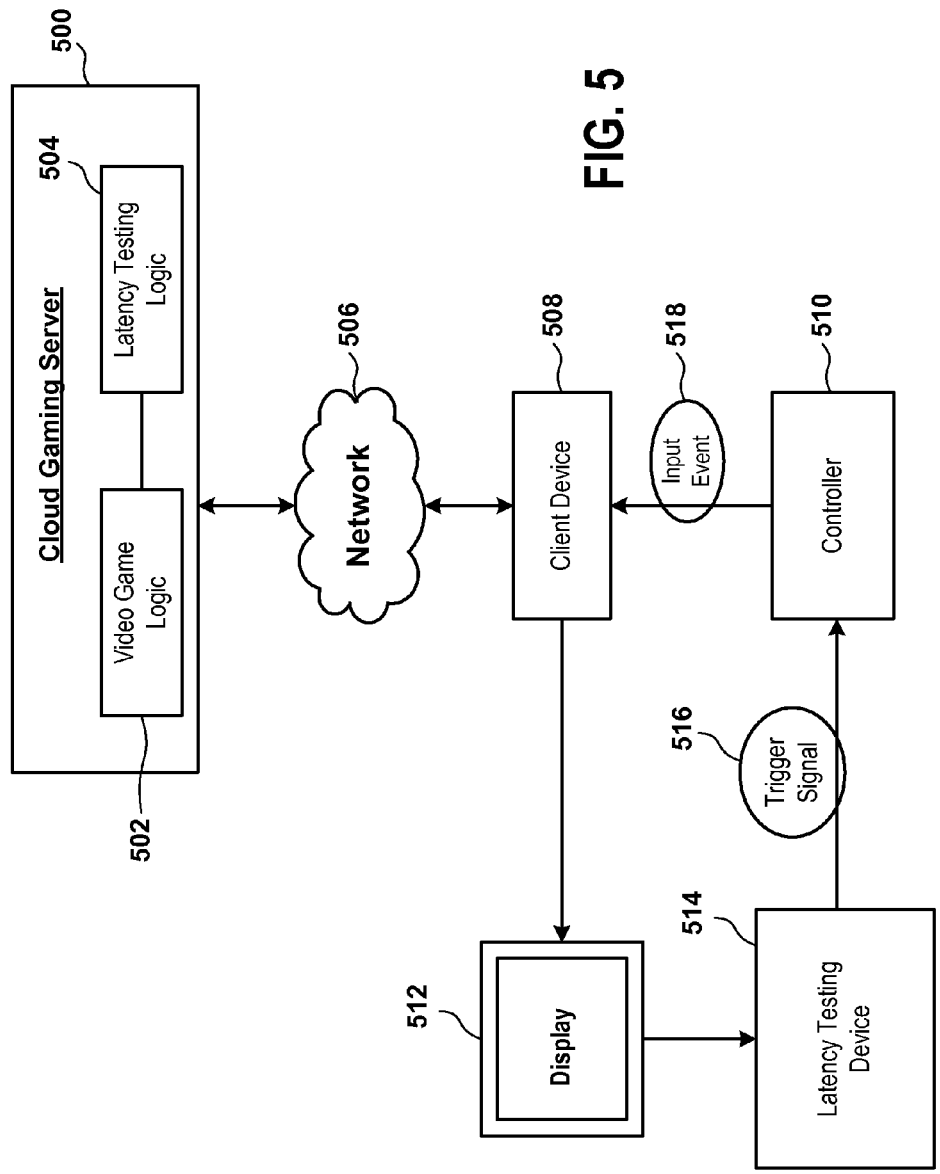
FIG. 5 illustrates a system for measuring latency of a cloud-based video game, in accordance with an embodiment of the invention.

FIG. 5 illustrates a system for measuring latency of a cloud-based video game, in accordance with an embodiment of the invention. In cloud-gaming implementations, the video game is executed on a cloud gaming server 500 to define video game logic 502. Latency testing logic 504 is provided to handle latency testing related functions at the video game. A client device 508 functions as a local terminal that communicates over a network 506 with the cloud-gaming server 500 to access the video game logic 502. In some implementations, the client device 508 receives video and audio data from the cloud gaming server, and may process and/or provide such data to the display 512 for rendering thereon. The client device 508 may also receive input from a controller device 510 that is operated by a user of the video game. Thus, the client device 508 acts as a local terminal providing local input and output functionality for the video game which is executed remotely. It will be appreciated that input events are communicated over network 506 to the video game logic 502, which in turn updates a game state and video/audio output in accordance with the input events, and the updated video/audio are returned to the client device 508 for rendering to the display device 512.

A latency testing device 514 is provided for measuring latency of the video game. The latency testing device 514 can communicate over network 506 with latency testing logic 504 to effect calibration and latency testing of the video game in a manner similar to that described with reference to the system of FIG. 4. For example, the latency testing device 514 may generate a trigger signal 516 that causes the controller 510 to generate an input event 518. The input event 518 is communicated to the client device 508, which processes and/or communicates the input event over network 506 to the video game logic 502. Upon processing of the input event by the video game logic, the latency testing logic 504 may cause a first color to change to a second color in the video output. This color change is rendered to the display 512 and detected by the latency testing device 514. The latency is then determined as the time elapsing from the triggering of the controller 510 to the color change on the display 512.

Figure 6:
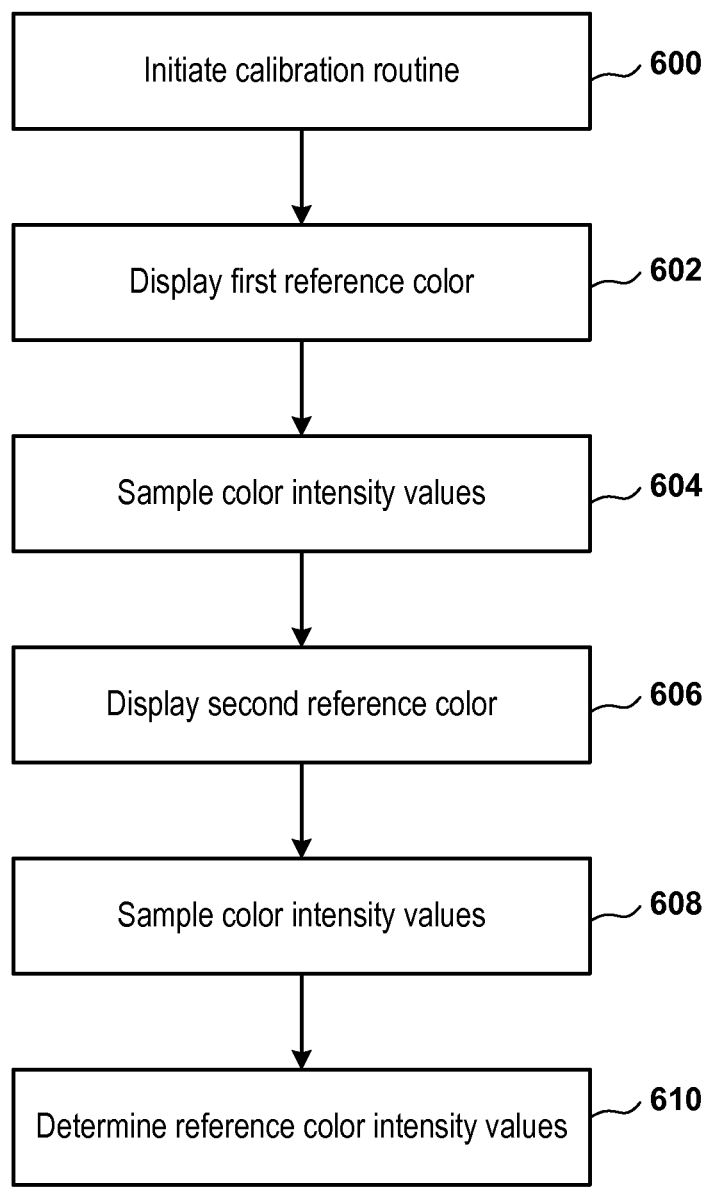
FIG. 6 illustrates a method for performing a calibration for testing latency of a video game system, in accordance with an embodiment of the invention.

FIG. 6 illustrates a method for performing a calibration for testing latency of a video game system, in accordance with an embodiment of the invention. At method operation 600, a calibration routine is initiated. At method operation 602, a first color is rendered on a display. At method operation 604, color intensity values (of colors sensed by a color sensor) are sampled while the first color is being rendered on the display. At method operation 606, a second color is rendered on the display. At method operation 608, color intensity values (of the color sensed by the color sensor) are sampled while the second color is being rendered on the display. At method operation 610, reference intensity values are determined for the first color based on the color intensity values sampled while the first color was rendered on the display. And reference intensity values are determined for the second color based on the color intensity values sampled while the second color was rendered on the display. The determined reference intensity values for each of the first color and second color can be utilized to later identify when the first color or the second color is being sensed by a color sensor.

A simple numerical example will further illustrate and clarify the first and second colors which are rendered on the display, and the reference intensity values of colors sensed by the color sensor. To produce a given color, a display may receive RGB data that defines the given color, the RGB data consisting of values for red, green and blue. Consider in the present example that each of these values may range from zero to 255. RGB values of (0,0,0) will produce that purest and highest intensity black color possible by the display (at its current settings), whereas RGB values of (255,0,0) will produce the purest and highest intensity red color possible by the display, RGB values of (0,255,0) will produce the purest and highest intensity green color possible by the display, RGB values of (0,0,255) will produce the purest and highest intensity blue color possible by the display, and RGB values of (255,255,255) will produce the purest and highest intensity white color possible by the display. For purposes of illustration, consider that when the display receives and renders RGB values of (255,0,0), then the display will be said to be rendering the color "red," and when the display receives and renders RGB values of (0,255,0), then the display will be said to be rendering the color "green."

The color sensor, in some implementations, may detect RGB intensity values—that is, intensity values for red, green, and blue, as sensed by the color sensor. Let us assume that the intensity values generated by the color sensor range from zero to 100. Then, when the display is configured to display the color "red" (received RGB values of (255,0,0)), the RGB intensity values generated by the color sensor could be, for example, (93,8,10). These RGB intensity values would define reference intensity values that correspond to the display of the color "red" on the display. In other words, when RGB intensity values (93,8,10) (or substantially similar values) are detected, then the display will be considered to be displaying the color "red." When the display is configured to display the color "green" (received RGB values of (0,255,0)), the RGB intensity values generated by the color sensor could be, for example, (7,88,9). These RGB intensity values would define reference intensity values that correspond to the display of the color "green" on the display. In other words, when RGB intensity values (7,88,9) (or substantially similar values) are detected, then the display will be considered to be displaying the color "green." In this manner, it can be determined by comparison of detected intensity values to the reference intensity values, whether the display is rendering the color "red" or "green." The change from "red" to "green" on the display can thus be detected and utilized as an indicator to determine video game latency in accordance with the techniques discussed herein.

Figure 7:
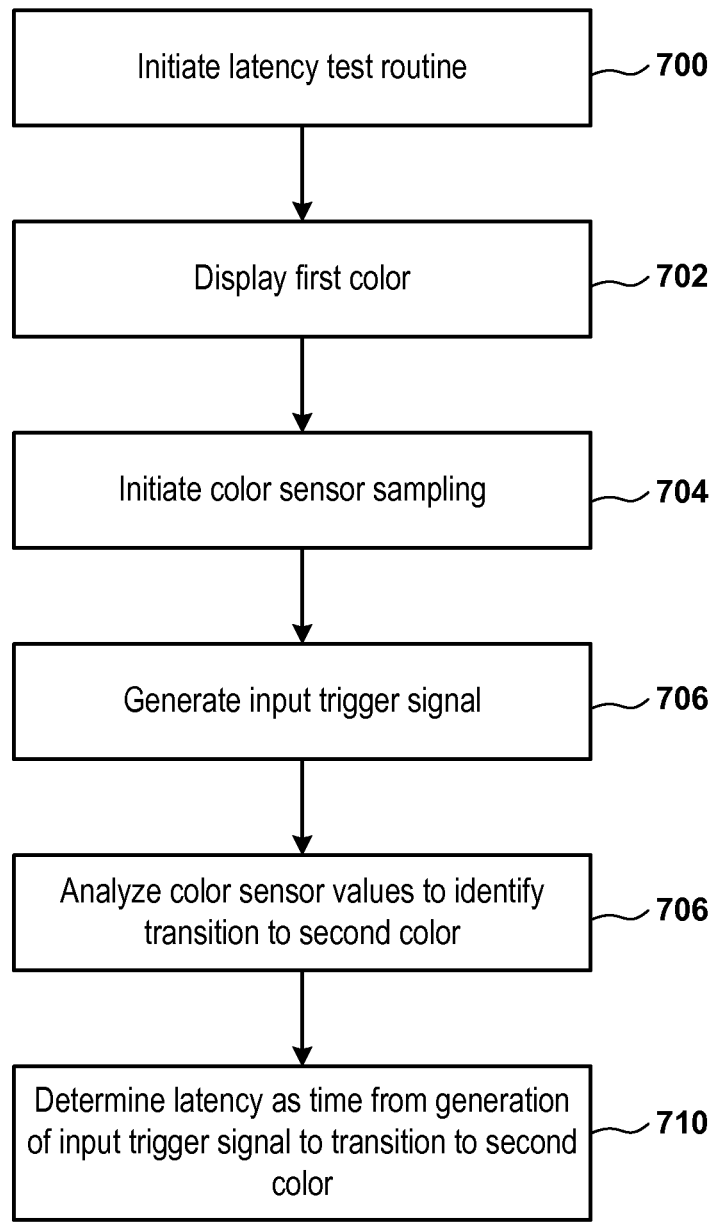
FIG. 7 illustrates a method for determining latency of a video game, in accordance with an embodiment of the invention.

FIG. 7 illustrates a method for determining latency of a video game, in accordance with an embodiment of the invention. At method operation 700, a latency testing routine is initiated. At method operation 702, a first color is displayed on a display device. At method operation 704, sampling of color intensity values by a color sensor is initiated. At method operation 706, an input trigger signal is generated and sent to a controller device, causing the controller device to generate and send an input event to the video game. The video game processes the input event, and in response, causes the first color to change to a second color. At method operation 708, the color intensity values generated by the color sensor are analyzed to identify when the transition from the first color to the second color occurred on the display device. At method operation 710, the video game latency is determined as the elapsed time from when the input trigger signal was generated to when the first color transitioned to the second color.

Figure 8:
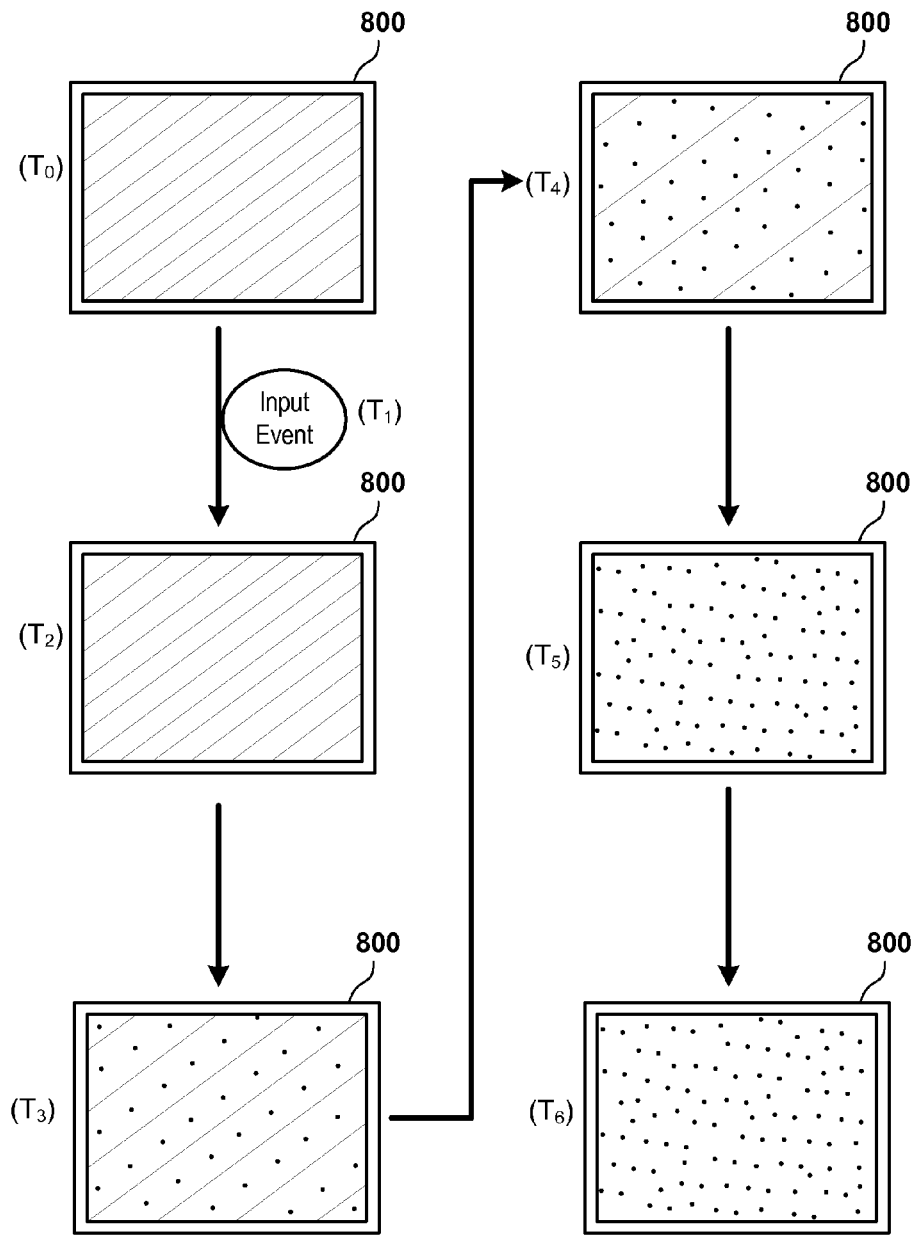
FIG. 8 illustrates changes from a first color to a second color rendered on a display, in accordance with an embodiment of the invention.

FIG. 8 illustrates changes from a first color to a second color rendered on a display, in accordance with an embodiment of the invention. A display 800 is shown at various time points during the course of performing a latency test routine, in accordance with an embodiment of the invention. At time $T_0$, the display 800 is configured to render a first color, indicated by the diagonal shading. At time $T_1$, an input event is generated for the video game. The video game processes the input event and in response, changes the first color to a second color. As has been noted, the transition from the first color to the second color occurs some time after the input event is generated due to various sources of latency including data communication, processing, and the response time of the display 800. Thus, at time $T_2$, following the generation of the input event, the display 800 continues to display the first color. At time $T_3$, the display 800 has received updated video data indicating that the second color is to be displayed. However, the first color does not instantaneously cease to be rendered nor does the second color instantaneously render at its full intensity (as defined by the video data) on the display. Rather, the intensity of the first color is reduced over time while the intensity of the second color (represented by the dotted shading) ramps up to its full intensity, as shown at times $T_3$, $T_4$, and $T_5$. At time $T_5$, the display of the second color first reaches its full intensity level as defined by the video data, and the first color is no longer displayed. This state is maintained at least through time $T_6$.

In some implementations (e.g. real-time implementations), the transition to the second color is deemed to be complete at time $T_6$, after the second color has been maintained at its full intensity level for a predefined period of time. This can help ensure that a steady state of display defined by the video data is fully achieved before halting the detection process. In the illustrated embodiment, the predefined period of time is equivalent to $T_6-T_5$. At time $T_6$, then the sampling of color intensity can be terminated, and the latency can be determined as the time elapsing from when the input event was generated ($T_1$) to when the second color reached full intensity ($T_5$).

Figure 9:
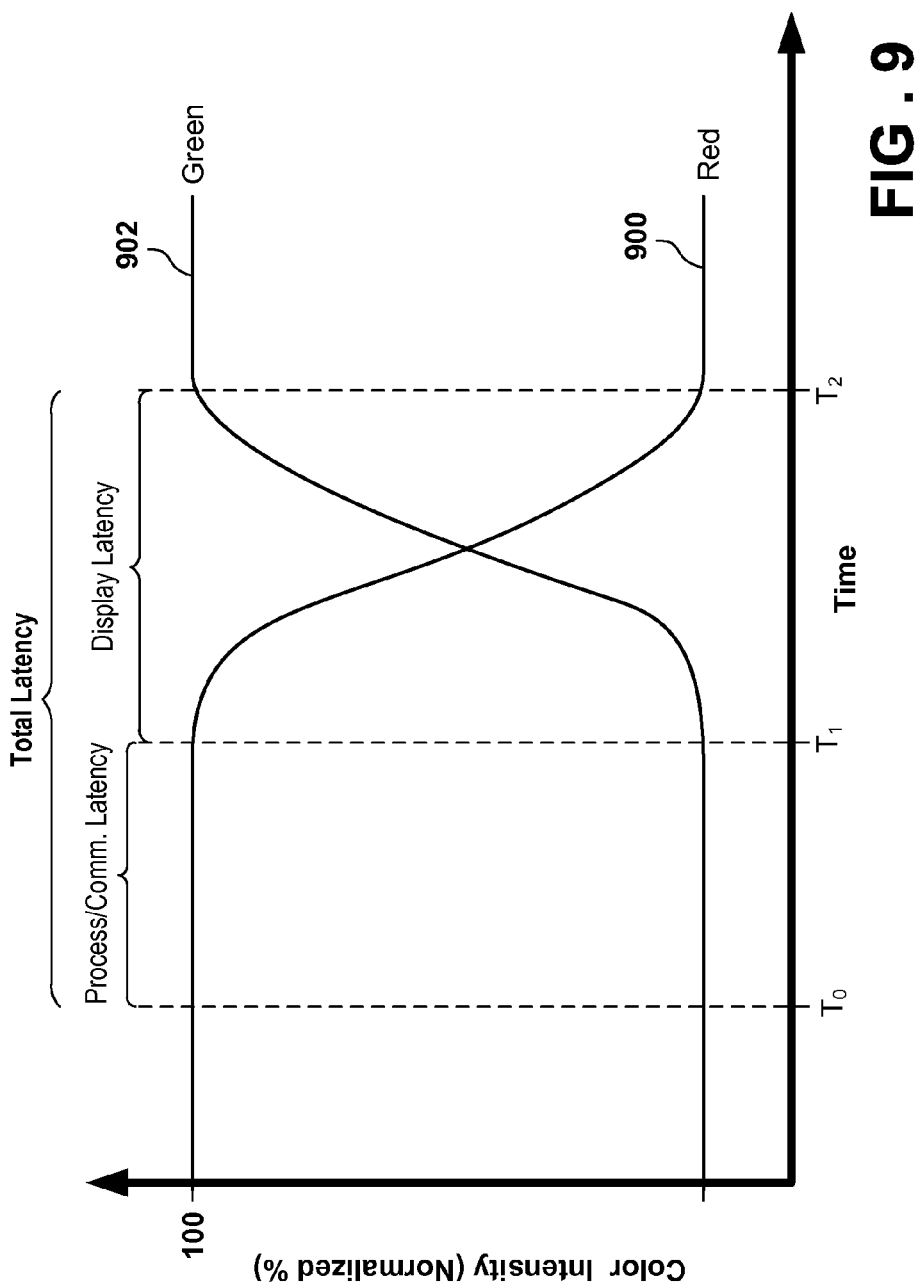
FIG. 9 is a graph illustrating sensed color intensity values over time, during a latency test routine, in accordance with an embodiment of the invention.

FIG. 9 is a graph illustrating sensed color intensity values over time, during a latency test routine, in accordance with an embodiment of the invention. The curve 900 illustrates the intensity values for a first sensed color by a color sensor. For the purposes of illustration in the present discussion, the first sensed color can be red. The curve 902 illustrates the intensity values for a second sensed color by the color sensor. For the purposes of illustration in the present discussion, the second sensed color can be green. The intensity values in the illustrated graph have been normalized to 100%. That is, a calibration was previously performed to determine the reference intensity values by the color sensor which correspond to display of first and second colors on a display. Subsequent intensity values generated by the color sensor during the latency test are then normalized as a percentage of the reference intensity values. The highest intensity level is 100%, while the lowest intensity level may be normalized to 0% or some minimum percentage level.

As shown, at time $T_0$, the red intensity is at 100%, while the green intensity is at a minimum level. At time $T_0$, an input event is generated and sent to the video game. From time $T_0$ to $T_1$, the red and green intensities are maintained, as the display continues to display the first color. This portion of the latency is due to the time required to communicate the input event, process the input event, and register a change from the first color to the second color in the video data supplied to the display in response to processing the input event by the video game. At time $T_1$, the display receives updated video data encoding for the change from the first color to the second color. After processing of the video data by the display, the pixels are controlled to change from the first color to the second color. Thus, the red and green intensities sensed by the color sensor begin to change, resulting in a crossing over of their respective intensities. That is, the red intensity falls from 100% to a minimum level while at the same time the green intensity increases from a minimum level to 100%, resulting in a crossover of the red and green intensities sensed by the color sensor. The display's processing of the updated video data and the crossover event occurs from time $T_1$ to $T_2$, and this portion of the latency is due to characteristics of the display device (e.g. display lag, pixel response time). At time $T_2$, the red intensity has reached a minimum level, while the green intensity has reached 100%, indicating that the second color is now rendered on the display at its full intensity.

Thus, the total latency of the video game system can be determined as the time elapsed from time $T_0$ to $T_2$, which is the time from the generation of the input event to the completion of the rendering of the color change on the display device.

It will be appreciated that in various implementations, the specific time endpoint utilized for the latency determination can be other than time $T_2$ as described above. For example, in some implementations, the time of the crossover event is utilized. The crossover event time may be defined by the time at which the relative intensities of the detected colors exhibit an inversion—e.g. in the instant example using green and red, when the green intensity reaches or exceeds the red intensity (or the red intensity falls to or below the green intensity).

In another implementation, the time endpoint for latency determination may be defined based on rise time as utilized in electronics, e.g. when the green intensity reaches 90% (or some other percentage) of its expected final value.

Though specific configurations have been described in the present disclosure, it will be noted that these are provided by way of example only, without limitation, and that in other implementations, various alternative configurations are possible. For example, in some implementations, the latency testing device initiates a latency test. However, in other implementations, the video game may initiate the latency test, for example by sending an output event to the latency testing device to trigger the latency testing device to start a latency test. In some implementations, the latency testing device communicates to a separate controller device. However, in other implementations, the functionality of the controller device can be included in the latency testing device itself.

Figure 10:
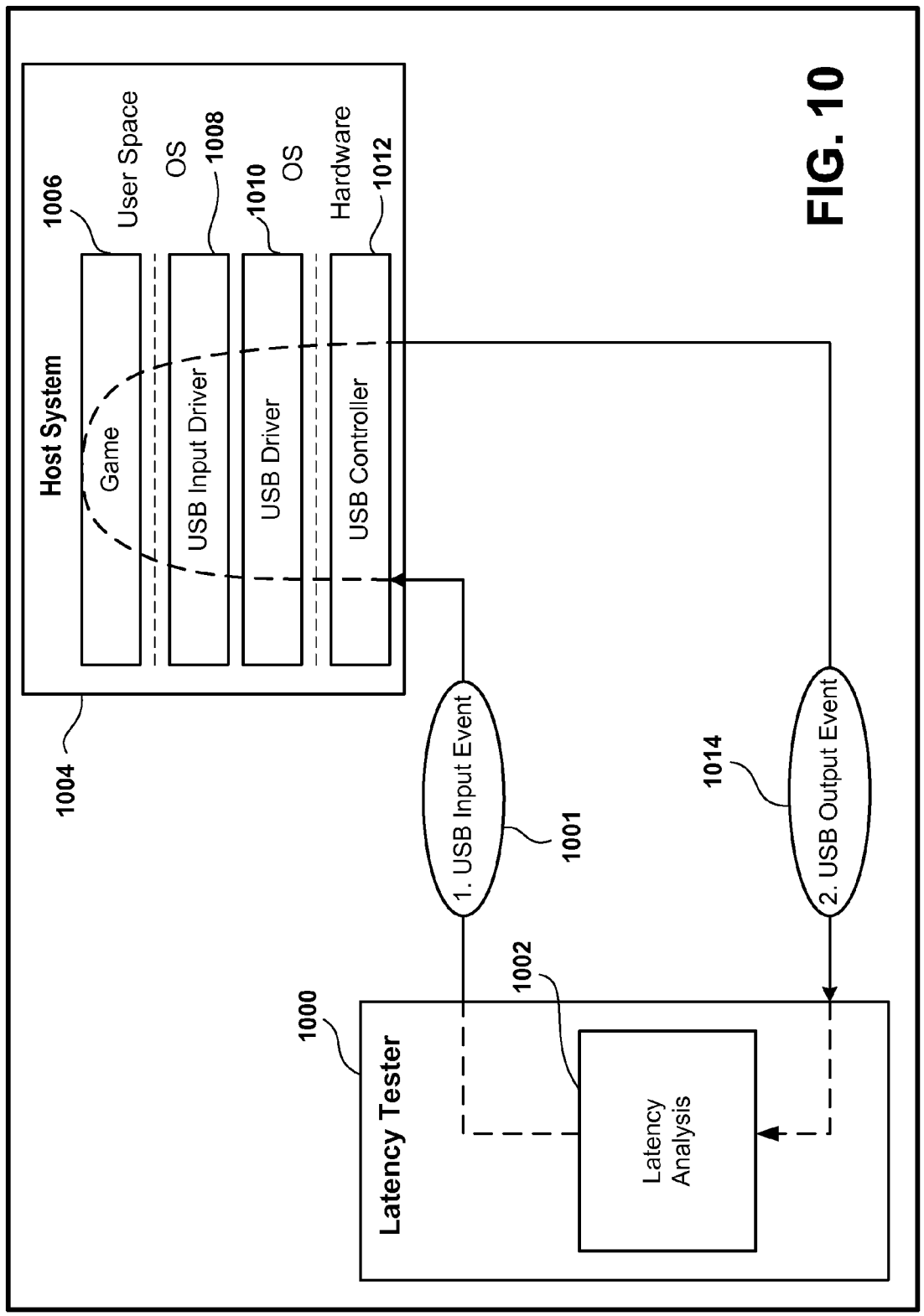
FIG. 10 conceptually illustrates an input latency test that is configured to determine input latency, in accordance with an embodiment of the invention.

It may also be desirable to identify the specific amount of latency contributed by specific portions of the gaming system. FIG. 10 conceptually illustrates an input latency test that is configured to determine input latency, in accordance with an embodiment of the invention. In the illustrated embodiment, the latency testing device 1000 causes generation of an input event 1001 (e.g. a USB input event) that is communicated to a host system 1004. It will be appreciated that the input event 1001 may be generated by the latency testing device 1000 itself (e.g. in implementations in which controller device functionality is included in the latency testing device), or the input event may be generated by a separate controller device (e.g. in response to being triggered by the latency testing device).

The input event 1001 is communicated to the host system 1004, which may be, for example, a game console, computer, cloud gaming server, or other device on which the video game runs. The input event 1001 may be communicated through various hardware and logical layers of the host system, including, for example, a hardware controller 1012 (e.g. USB controller), a driver 1010 (e.g. USB driver), and an input driver 1012 (e.g. USB input driver), before reaching the game logic 1006. Upon receipt, the game logic 1006 is configured to immediately and responsively generate, without any further processing, an output event 1014 (e.g. USB output event) that is communicated back to the latency tester 1000 (or controller device, if present), via the same pathway as the input event 1001, but in reverse order. That is, the output event 1014 is communicated via the input driver 1008, the driver 1010, and the hardware controller 1012, back to the latency testing device 1000. Upon receipt of the output event 1014, latency analysis logic 1002 determines the input latency as the elapsed time from the generation of the input event 1001, to the receipt of the output event 1014, divided by two.

Figure 11:
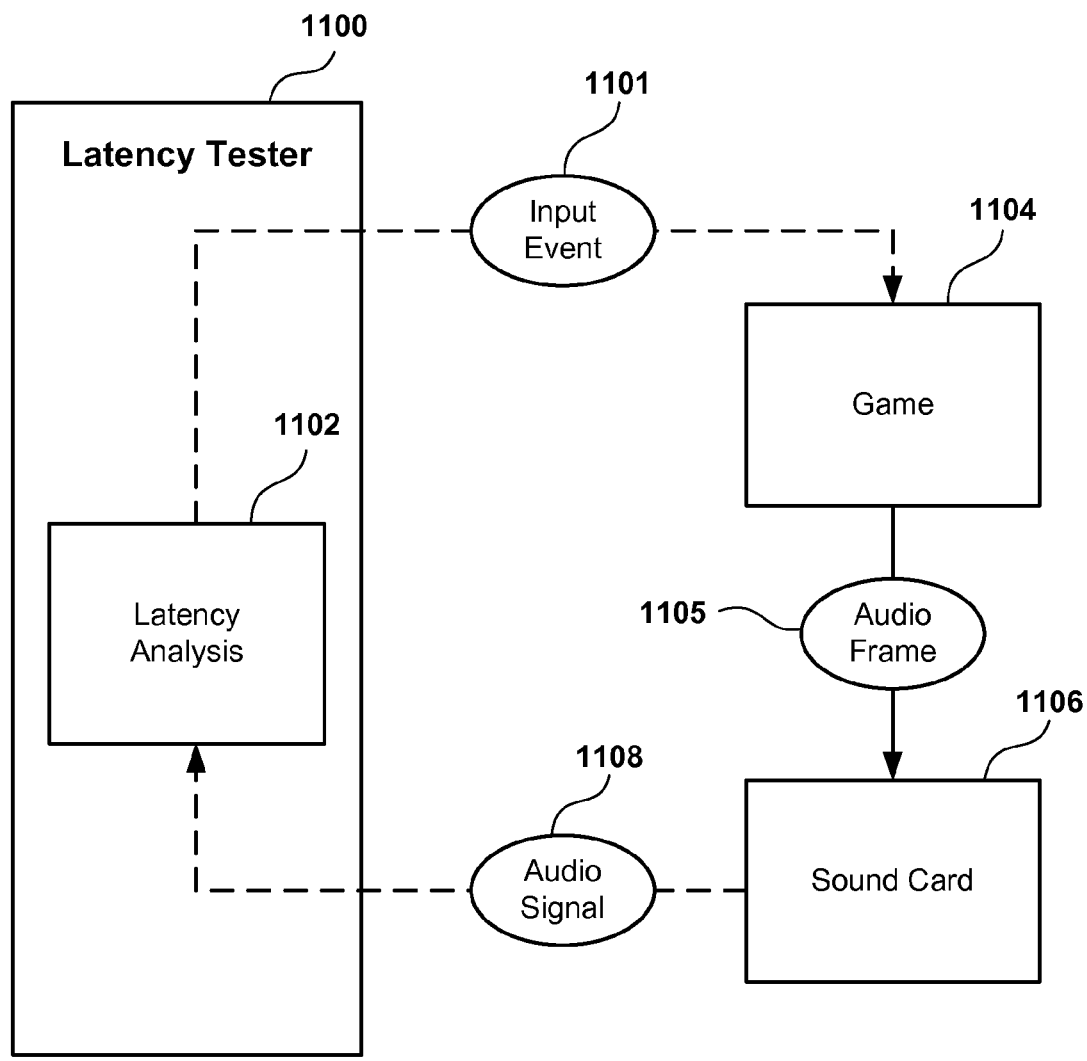
FIG. 11 illustrates latency testing of a video game based on audio output, in accordance with an embodiment of the invention.

FIG. 11 illustrates latency testing of a video game based on audio output, in accordance with an embodiment of the invention. The latency testing device 1100 generates, or causes a controller device to generate, an input event 1101, that is communicated to game logic 1104. The game logic 1104 processes the input event and generates in response an audio frame 1105 incorporating a change in audio that indicates receipt and processing of the input event 1101. The audio frame 1105 is processed by a sound card 1106, which produces a change in an audio signal 1108 that is generated by the sound card. The audio signal 1108 is received by the latency testing device 1100, and latency analysis logic 1102 analyzes the audio signal 1108 to identify when the change in the audio signal occurred, and determines the latency as the time from the generation of the input event 1101 to the detection of the change in the audio signal. Examples of changes in the audio signal may include a change in frequency of audio, a change in amplitude/volume, a change in waveform, or any other type of audio signal change which may indicate processing of an input event for purposes of latency testing.

In some implementations, the game may generate no audio prior to receiving an input event; then after receiving the input event, the game generates audio (e.g. sine wave). An analog-digital converter (ADC) could be utilized (e.g. on a microcontroller/processor included in the latency testing device), in combination with audio filters and integration logic. In some implementations, the game generates a sine wave output (e.g. 1 kHz) and adjusts the volume significantly after receiving an input event. The ADC could be utilized in conjunction with signal processing logic (e.g. integrator to generate a "constant" value to feed to the ADC).

In some implementations, the game generates a sine wave (e.g. 1 kHz) and after receiving an input event, adjusts the frequency (e.g. to 2 kHz). Pulse width modulation (PWM) input on a microcontroller could be used for detecting the period of the audio signal. Analog signal processing could be applied before feeding the signal to the microcontroller (e.g. amplify the signal into a square wave, etc.). in some implementations, the game generates a square wave signal (e.g. 1 kHz) and again after receiving an input event, the frequency is adjusted. PWM input on the microcontroller can be utilized. Limited audio processing may be required if enough harmonics can be preserved in the audio signal. In this respect, it is noted that in some implementations (e.g. cloud gaming), audio may be compressed causing loss of information.

Figure 12:
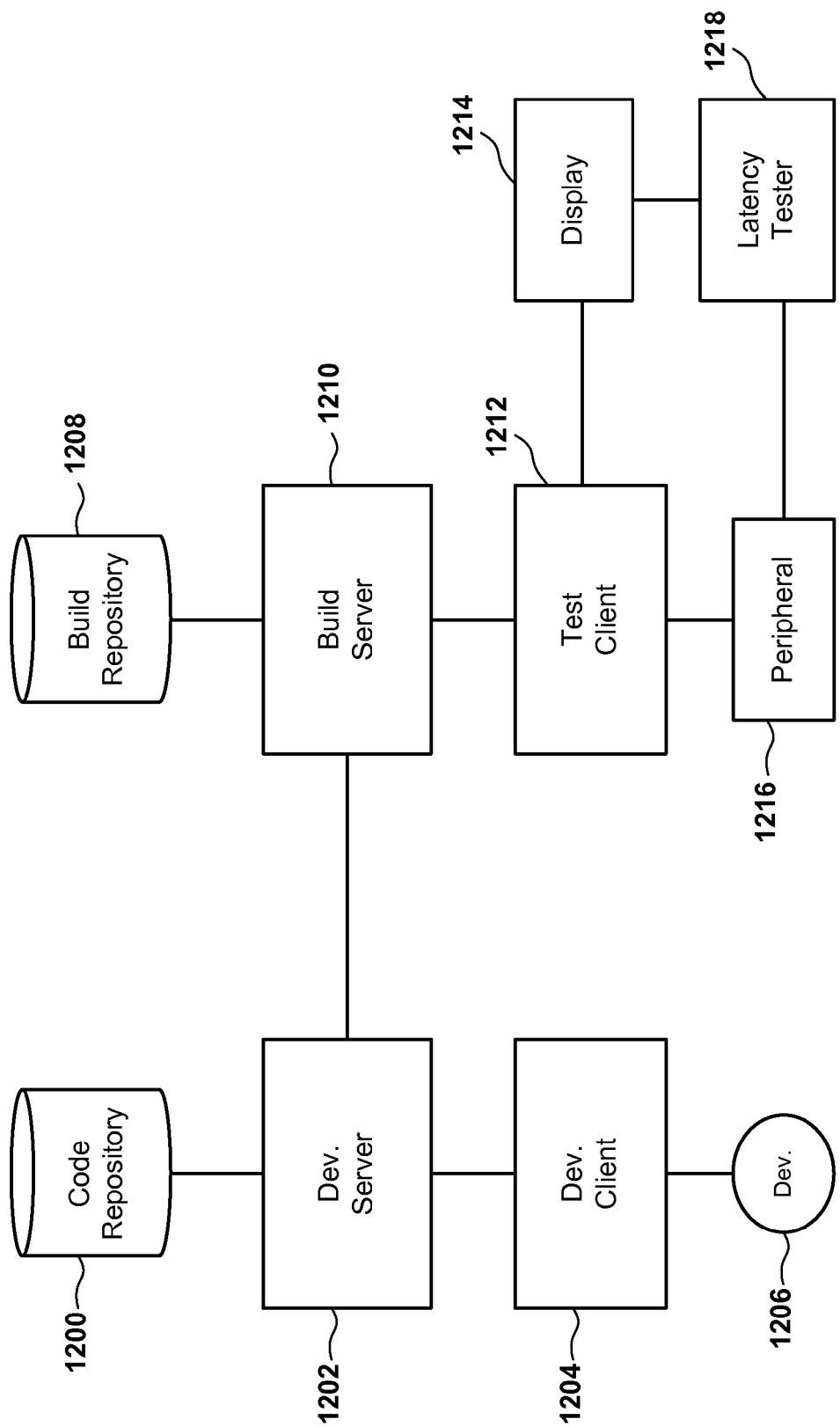
FIG. 12 illustrates a system for testing latency of game builds, in accordance with an embodiment of the invention.

FIG. 12 illustrates a system for testing latency of game builds, in accordance with an embodiment of the invention. A code repository 1200 is provided, which contains the various source code portions, assets, and other software portions of a video game. A development server 1202 manages access to the code repository 1200. A development client 1204 provides an interface through which a developer 1206 performs development of the video game, including creation and modification of the video game source code. A build server 1210 generates builds of the video game (e.g. compiling the video game source code to generate executable files for the intended execution platform), and the builds are stored to a build repository 1208. By way of example, the build server 1210 may be configured to generate builds on a nightly basis (e.g. generate so-called "nightlies"), which will incorporate the changes made to the source code up to that point.

In some implementations, a test client 1212 is provided for testing the latency of the video game builds. The test client 1212 is a platform on which the video game build can be executed. To perform the latency test, a latency testing device 1218 may interface with a peripheral device 1216 (e.g. controller device) and a display 1214 that is connected to the test client 1212. The latency testing may be performed in accordance with the embodiments discussed elsewhere herein. In some implementations, the latency test can be performed in coordination with the build schedule. For example, if builds are generated nightly, then the latency testing may be configured to be automatically performed following the generation of the latest nightly build. The results of the latency test can be reported and compared to prior results, and can be analyzed to determine whether changes incorporated into the build result in changes to the video game's latency.

In some implementations, there may be multiple test clients configured to provide different platforms. This allows for latency to be tested across different gaming platforms, thereby demonstrating whether latency differs from one platform to another.

The presently described embodiments are provided by way of example, without limitation, and it will be appreciated that various modifications are possible. As has been noted, a latency test may be performed based on detection of a change in a portion/region of a display. In some implementations, the region of the display is the entirety of the display screen, whereas in other implementations, the region is a half or a quarter of the display screen, or some other fraction of the display screen. In still other implementations, the calibration process can be configured to determine what portion of the display screen is being monitored by the latency tester, and accordingly, the video game can be configured to produce a change in the portion of the display screen (in response to a received input) that is being monitored for purposes of testing latency. By way of example, the portion of the display screen being monitored can be determined by displaying various colors on the display screen, and identifying which color is being detected by the latency tester, and then correlating the identified color to the portion of the display screen at which it was detected. In some implementations, an iterative process may be utilized to progressively identify smaller and smaller portions of the display which include that being monitored by the latency testing device.

Various display devices may have different characteristics and employ different types of display technologies. For example, some displays perform backlight modulation as a method of achieving varying brightness levels. While such modulation is performed at frequencies that are invisible to the human eye, they will be noticeable to a color sensor having sample rates in the millisecond range, such as have been discussed herein. Samples taken when the backlight is on will differ to a large extent from those taken when the backlight is off. Therefore, in some implementations, a calibration is performed to identify display characteristics such as backlight behavior, and when the latency test is performed, such characteristics may be filtered out or otherwise accounted for so as to permit the accurate determination of sensed color intensity and latency.

In another implementation, a game developer may add custom remote play functionality to a game undergoing development, to allow a remote user (e.g. a beta tester) to test the latency of the game. The developer could authorize the user to enable a special mode for latency testing, and the latency experienced by the remote user could be tested.

In another implementation, an application on a portable device (e.g. smart phone) could provide for functionality similar to that of the aforementioned latency tester. For example, such an application could utilize a built-in camera on the portable device, and connect to a gaming platform (e.g. connect via WiFi to cloud gaming server).

Figure 13A:
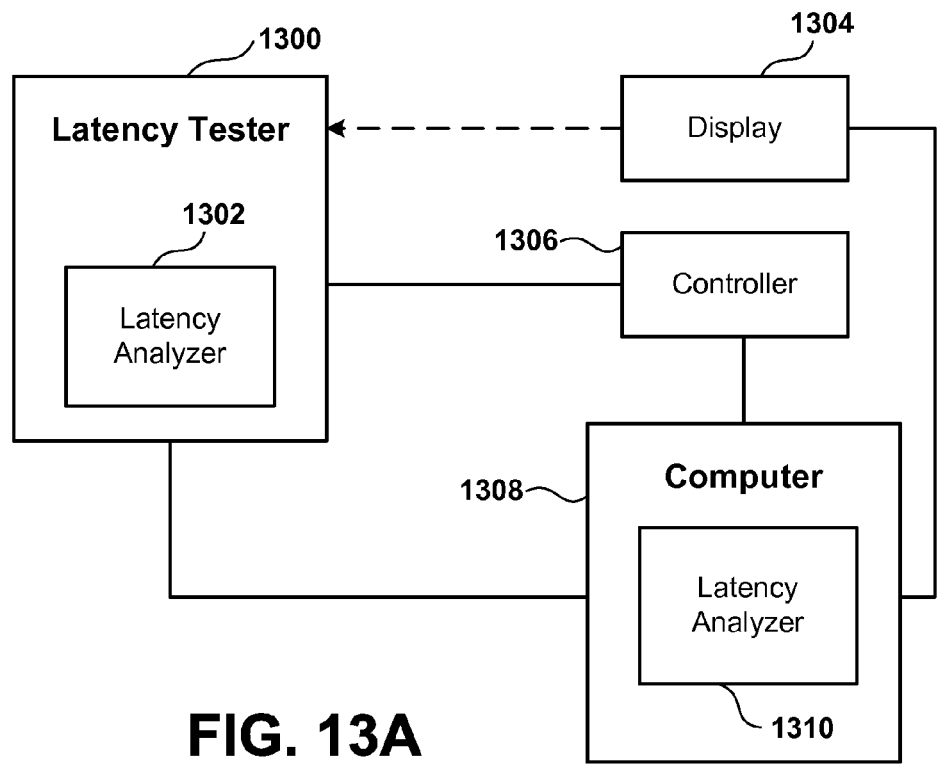
FIG. 13A illustrates a system for testing latency of a video game, in accordance with an embodiment of the invention.

FIG. 13A illustrates a system for testing latency of a video game, in accordance with an embodiment of the invention. Broadly speaking, the illustrated system can be configured to perform latency testing in accordance with the principles described elsewhere herein. As shown, the latency tester 1300 includes a latency analyzer 1302 that is configured to analyze data to determine latency of the videogame. The latency tester 1300 communicates with a separate controller device 1306. As discussed, the controller 1306 can be triggered by the latency tester 1300 to generate an input event that is fed to a separate computer 1308. The computer 1308 can be configured to execute the video game, or in another embodiment, can function as a local terminal for communicating to a cloud-based videogame server. In response to processing of the input event, a change is rendered to the display 1304, and this change is detected by the latency tester 1300 for purposes of determining the latency of the system.

It should be appreciated that the controller device 1306 need not include all of the features or functionality of a regular controller intended for use by a user during actual gameplay of the video game. For example, the controller device 1306 does not necessarily include any particular physical/mechanical input mechanisms such as buttons, triggers, joysticks, motion sensors, etc. Rather, the controller device 1306 need only include such hardware as is necessary for performing the functions required for testing latency as defined herein, such as generating an input event. For example, in one implementation, the controller device 1306 includes communications hardware for communicating with both of the latency tester 1300 and the computer 1308, and hardware for generating at least one type of input event to be communicated to the computer 1308. The hardware the generates the input event need not be the same as that of a controller intended for use during actual gameplay, but need only be capable of generating an equivalent input event.

In another implementation, the computer 1308 can include a latency analyzer 1310, which can be configured to perform functions similar to that of the latency analyzer 1302. In such an implementation, the latency tester 1300 communicates with the computer 1308, for example, to send data such as color sensor data to be analyzed by the latency analyzer 1310 to determine latency.

Figure 13B:
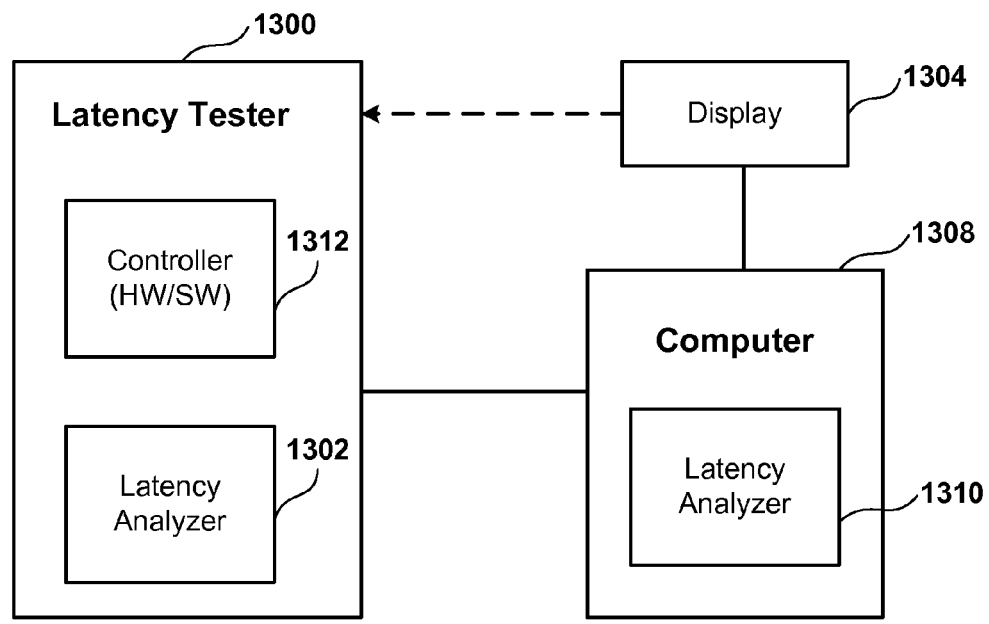
FIG. 13B illustrates a system for testing latency of a video game, in accordance with an embodiment of the invention.

FIG. 13B illustrates a system for testing latency of a video game, in accordance with an embodiment of the invention. In the illustrated implementation, there is no separate controller device. Rather, the equivalent functionality of the controller device is to find at the latency tester 1300 by a controller module 1312. The controller module 1312 can be defined by hardware from a regular controller device that is intended for use during gameplay, or as noted above, can be defined by hardware that is configured to produce an equivalent input event. In another implementation, the controller module 1312 can be defined by logic that models a controller device. For example, the time required for a controller device to generate an input event and communicated to the computer 1308 may be known or otherwise predefined, and such can be utilized to determine the overall latency without actually utilizing hardware from the controller device.

Figure 13C:
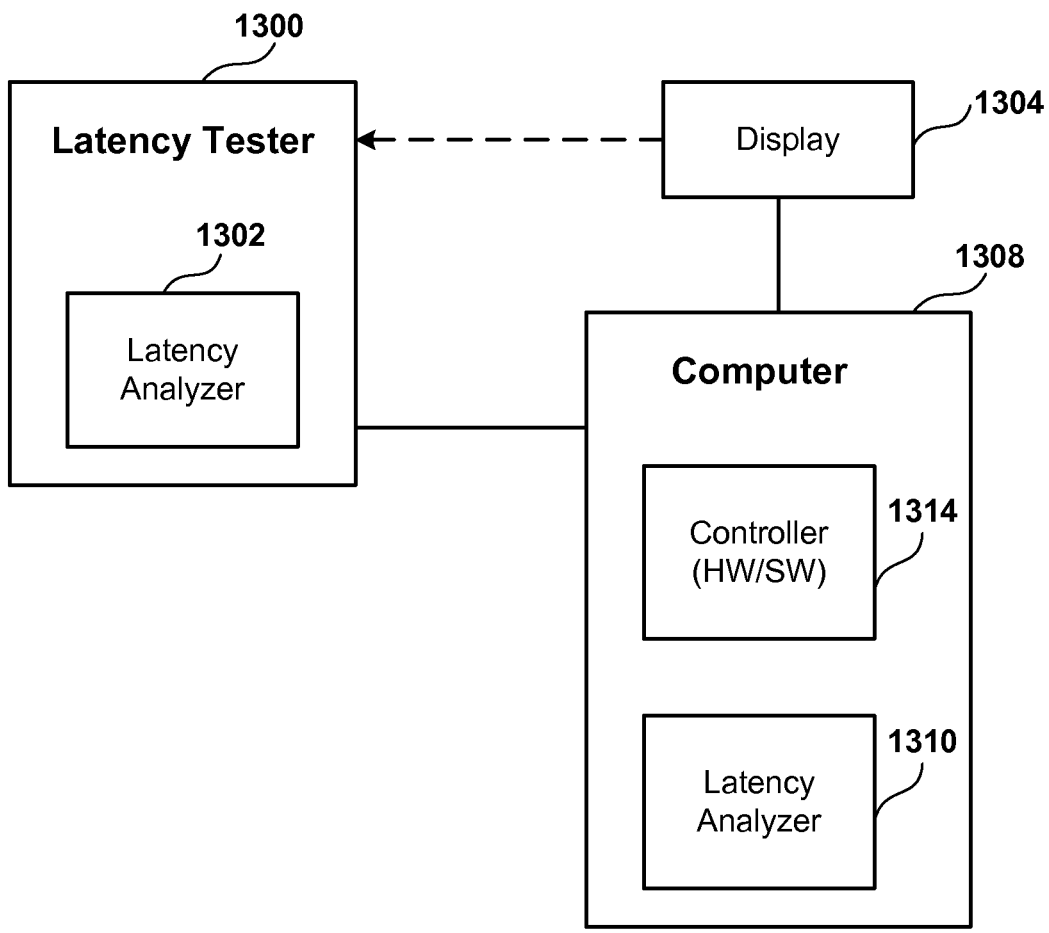
FIG. 13C illustrates a system for testing latency of a video game, in accordance with an embodiment of the invention.

FIG. 13C illustrates a system for testing latency of a video game, in accordance with an embodiment of the invention. In the embodiment of FIG. 13C, the controller module has been incorporated into the computer 1308 as controller module 1314. As has been noted, the controller module 1314 can be defined by hardware from a regular controller device, equivalent hardware the generates an equivalent input event for purposes of latency testing, and/or logic defining a model of a controller device or portion thereof.

Figure 14:
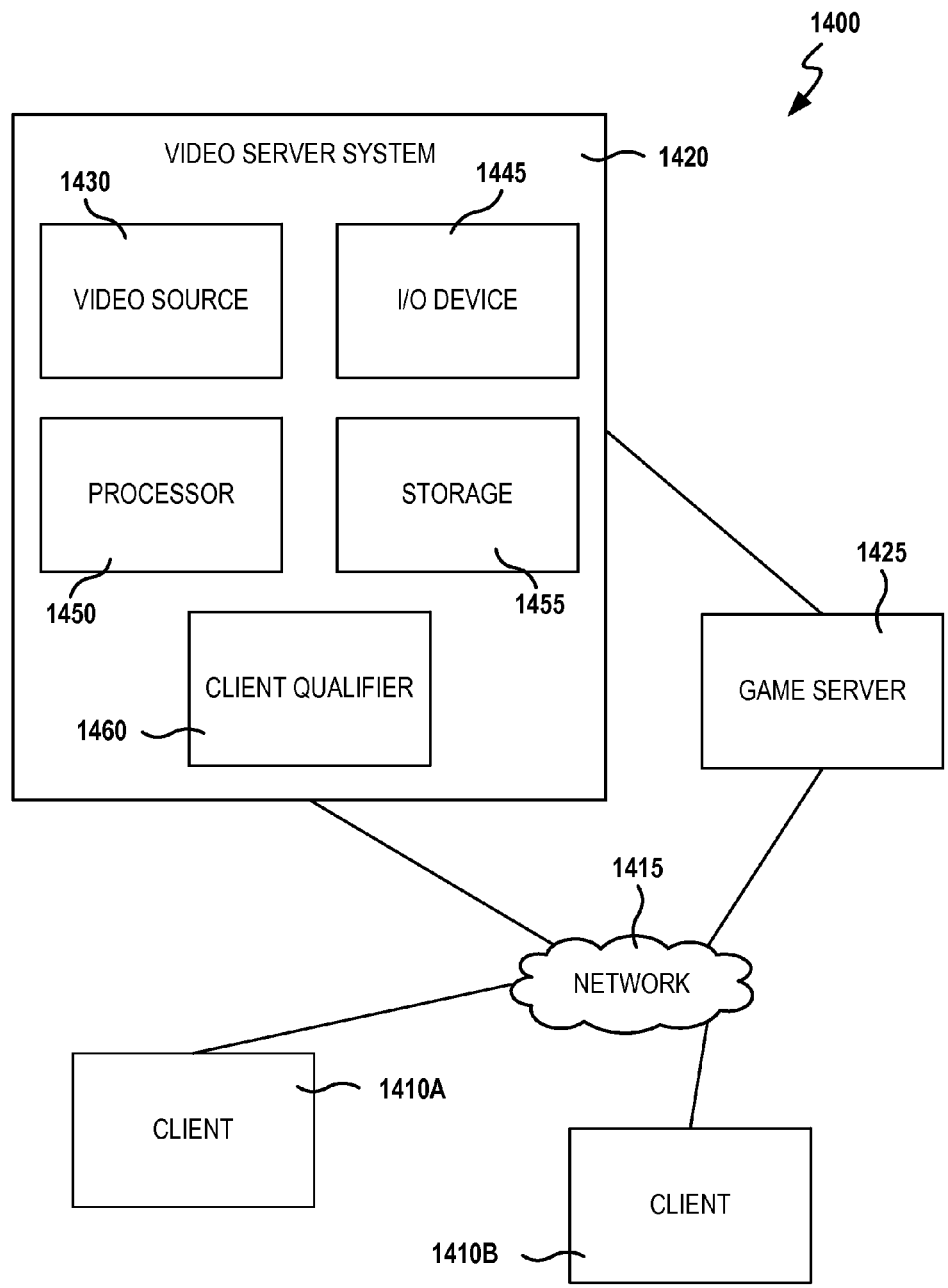
FIG. 14 is a block diagram of a Game System, according to various embodiments of the invention.

FIG. 14 is a block diagram of a Game System 1400, according to various embodiments of the invention. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1420 frames per second. Although higher or lower frame rates are included in alternative embodiments of the invention.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command. Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multiplayer game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.265, H.264, H.263, On2, VP6, VC-1, WMA, Huffyuv, Lagarith, MPG-x, Xvid, FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream, optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the present disclosure.

What is claimed is:

1. A method, comprising:
sensing color intensity values of light emitted from a portion of a display screen for a predefined period of time, the display screen being configured to display a video stream that defines the light emitted from the portion of the display screen, the video stream being generated by an executing video game;
during the period of time, triggering a controller device to communicate an input event to the video game, the video game being configured to process the input event and responsively update the video stream to change a color of the light emitted from the portion of the display screen, from a first color to a second color;
analyzing the sensed color intensity values to identify a latency amount that is defined by a duration of time extending from the triggering of the controller device to the change in the color of the light emitted from the portion of the display screen.

2. The method of claim 1, wherein sensing color intensity values is performed by a color sensor at a predefined sample rate.

3. The method of claim 2, wherein analyzing the sensed color intensity values includes determining an amount of the sensed color intensity values recorded between the triggering of the controller device and the change in the color of the light, and determining the latency amount based on the determined amount of the sensed color intensity values and the predefined sample rate.

4. The method of claim 1, wherein the video game is executed on one or more of a local computing device and/or a remote gaming server.

5. The method of claim 1, wherein the input event is defined to effect an in-game action when processed by the executing video game.

6. The method of claim 1, further comprising, displaying the latency amount on a second display screen.

7. The method of claim 1, further comprising, sending the latency amount to the executing video game.

8. The method of claim 1, wherein the sensed color intensity values include color intensity values for a first sensed color by the color sensor, and color intensity values for a second sensed color by the color sensor.

9. The method of claim 8, wherein analyzing the sensed color intensity values includes comparing the color intensity values for the first sensed color with reference intensity values for the first sensed color, and comparing the color intensity values for the second sensed color with reference intensity values for the second sensed color.

10. The method of claim 9, wherein the first sensed color and the second sensed color are selected from the group consisting of red, green, or blue.

11. A latency tester device, comprising:
a color sensor for sensing color intensity values of light emitted from a portion of a display screen for a predefined period of time, the display screen being configured to display a video stream that defines the light emitted from the portion of the display screen, the video stream being generated by an executing video game;
a signal generator configured to generate a signal, during the period of time, triggering a controller device to communicate an input event to the video game, the video game being configured to process the input event and responsively update the video stream to change a color of the light emitted from the portion of the display screen, from a first color to a second color;
a latency analyzer configured to analyze the sensed color intensity values to identify a latency amount that is defined by a duration of time extending from the triggering of the controller device to the change in the color of the light emitted from the portion of the display screen.

12. The latency tester device of claim 11, wherein the color sensor is configured to sense color intensity values at a predefined sample rate.

13. The latency tester device of claim 12, wherein the latency analyzer is configured to determine an amount of the sensed color intensity values recorded between the triggering of the controller device and the change in the color of the light, and determine the latency amount based on the determined amount of the sensed color intensity values and the predefined sample rate.

14. The latency tester device of claim 11, wherein the video game is executed on one or more of a local computing device and/or a remote gaming server.

15. The latency tester device of claim 11, wherein the input event is defined to effect an in-game action when processed by the executing video game.

16. The latency tester device of claim 11, further comprising, a local display screen configured to display the latency amount.

17. The latency tester device of claim 11, further comprising, sending the latency amount to the executing video game.

18. The latency tester device of claim 11, wherein the sensed color intensity values include color intensity values for a first sensed color by the color sensor, and color intensity values for a second sensed color by the color sensor.

19. The latency tester device of claim 18, wherein the latency analyzer is configured to compare the color intensity values for the first sensed color with reference intensity values for the first sensed color, and compare the color intensity values for the second sensed color with reference intensity values for the second sensed color.

20. The latency tester device of claim 19, wherein the first sensed color and the second sensed color are selected from the group consisting of red, green, or blue.

21. A method for detecting latency of a gaming system, comprising:
detecting, by a color sensor, a first color rendered on a portion of a display by a gaming system, the first color being rendered as part of a video stream generated by the gaming system;
triggering a controller device to generate and send an input event to the gaming system, the gaming system being configured to process the input event and responsively update the video stream to change the first color to a second color;
detecting, by the color sensor, the change from the first color to the second color rendered on the portion of the display;
determining a latency amount as an amount of time measured from the triggering of the controller device to the detection of the change from the first color to the second color.

22. The method of claim 21,
wherein detecting the first color includes sensing, by a color sensor, first intensity values of light emitted from the portion of the display when the first color is rendered on the portion of the display, and determining the first intensity values as being substantially similar to reference intensity values that identify the first color; and
wherein detecting the change from the first color to the second color includes sensing, by the color sensor, second intensity values of light emitted from the portion of the display when the second color is rendered on the portion of the display, and determining the second intensity values as being substantially similar to reference intensity values that identify the second color.

23. The method of claim 22,
wherein the reference intensity values that identify the first color include a first reference intensity value for a first reference color detected by the color sensor, and a second reference intensity value for a second reference color detected by the color sensor; and
wherein the reference intensity values that identify the second color include a third reference intensity value for the first reference color, and a fourth reference intensity value for the second reference color.

24. The method of claim 23, wherein the first reference color and the second reference color are selected from the group consisting of red, green, and blue.

25. The method of claim 22,
wherein determining the first intensity values as being substantially similar to the reference intensity values that identify the first color includes, normalizing the first intensity values against the reference intensity values that identify the first color; and
wherein determining the second intensity values as being substantially similar to the reference intensity values that identify the second color includes, normalizing the second intensity values against the reference intensity values that identify the second color.

26. The method of claim 22, further comprising,
performing a calibration operation to determine the reference intensity values that identify the first color and the reference intensity values that identify the second color.

27. The method of claim 22, further comprising, issuing a command to the gaming system to cause the first color to be rendered on the portion of the display.

28. The method of claim 21, further comprising:
substantially simultaneous with triggering the controller device, initiating a timer;
substantially simultaneous with detecting the change from the first color to the second color, stopping the timer;
wherein the latency amount is defined by the duration from the initiation of the timer to the stopping of the timer.

29. The method of claim 21, wherein the gaming system is a console device.

30. The method of claim 21, wherein the gaming system is a cloud gaming server.

* * * * *